(12) United States Patent
Suzuki et al.

(10) Patent No.: US 12,512,140 B2
(45) Date of Patent: Dec. 30, 2025

(54) NONVOLATILE SEMICONDUCTOR MEMORY AND MANUFACTURING METHOD THEREFOR

(71) Applicant: Kioxia Corporation, Tokyo (JP)

(72) Inventors: Kunifumi Suzuki, Yokkaichi Mie (JP); Yuuichi Kamimuta, Nagoya Aichi (JP)

(73) Assignee: KIOXIA CORPORATION, Tokyo (JP)

( * ) Notice: Subject to any disclaimer, the term of this patent is extended or adjusted under 35 U.S.C. 154(b) by 179 days.

(21) Appl. No.: 18/459,962

(22) Filed: Sep. 1, 2023

(65) Prior Publication Data

US 2024/0096389 A1 Mar. 21, 2024

(30) Foreign Application Priority Data

Sep. 21, 2022 (JP) .................... 2022-150447

(51) Int. Cl.

| | |
|---|---|
| *G11C 11/22* | (2006.01) |
| *G11C 16/04* | (2006.01) |
| *H10B 51/10* | (2023.01) |
| *H10B 51/20* | (2023.01) |
| *H10B 51/30* | (2023.01) |
| *H10D 30/01* | (2025.01) |
| *H10D 30/69* | (2025.01) |

(Continued)

(52) U.S. Cl.
CPC ...... *G11C 11/2273* (2013.01); *G11C 11/2275* (2013.01); *G11C 16/0483* (2013.01); *H10B 51/10* (2023.02); *H10B 51/20* (2023.02); *H10B 51/30* (2023.02); *H10D 30/0415* (2025.01); *H10D 30/701* (2025.01); *H10D 64/033* (2025.01); *H10D 64/689* (2025.01)

(58) Field of Classification Search
CPC ............ G11C 11/2273; G11C 11/2275; G11C 16/0483; G11C 11/223; H10B 51/10; H10B 51/20; H10B 51/30; H10D 30/0415; H10D 30/701; H10D 64/033; H10D 64/689
USPC .......................................... 365/189.011, 158
See application file for complete search history.

(56) References Cited

U.S. PATENT DOCUMENTS 6,967,859 B2 * 11/2005 Kato ....................... G11C 11/22
365/145
10,468,495 B2 11/2019 Lin et al.
(Continued)

FOREIGN PATENT DOCUMENTS

JP 2019-169573 A 10/2019

*Primary Examiner* — Michael T Tran
(74) *Attorney, Agent, or Firm* — Foley & Lardner LLP

(57) ABSTRACT

A memory cell includes: a core structure extending in a first direction orthogonal to a semiconductor substrate; a semiconductor layer extending in the first direction and in contact with the core structure; an insulating layer extending in the first direction and in contact with the semiconductor layer; a ferroelectric layer extending in the first direction and in contact with the insulating layer; a first electrode extending in a second direction orthogonal to the first direction and in contact with the ferroelectric layer; a second electrode adjacent to the first electrode in the first direction, extending in the second direction, and in contact with the ferroelectric layer; an insulating layer stacked in the first direction and disposed between the first and second electrodes; and an antiferroelectric layer disposed between the first and second electrodes, and in contact with the insulating layer and the ferroelectric layer.

10 Claims, 17 Drawing Sheets

(51) Int. Cl.
*H10D 64/01* (2025.01)
*H10D 64/68* (2025.01)

(56) References Cited

U.S. PATENT DOCUMENTS

| | | | |
|---|---|---|---|
| 10,720,437 B2* | 7/2020 | Yoo | G11C 5/025 |
| 11,450,370 B2* | 9/2022 | Yuh | G11C 11/2273 |
| 2019/0273087 A1* | 9/2019 | Morris | H10D 64/689 |
| 2019/0296234 A1 | 9/2019 | Yoshimura et al. | |
| 2022/0231026 A1* | 7/2022 | Wu | G11C 13/003 |

* cited by examiner

I – I

II-II

III-III

NONVOLATILE SEMICONDUCTOR MEMORY AND MANUFACTURING METHOD THEREFOR

CROSS-REFERENCE TO RELATED APPLICATION

This application is based upon and claims the benefit of priority from Japanese Patent Application No. 2022-150447, filed Sep. 21, 2022, the entire contents of which are incorporated herein by reference.

FIELD

Embodiments described herein relate generally to a nonvolatile semiconductor memory and a manufacturing method therefor.

BACKGROUND

Ferroelectric memories have attracted interest as nonvolatile memories. Examples of the ferroelectric memories include 3-terminal memories in which ferroelectric layers are used as gate insulating layers of memory cell transistors and 2-terminal memories in which ferroelectric layers are provided between two electrodes.

DETAILED DESCRIPTION

Figure 1:
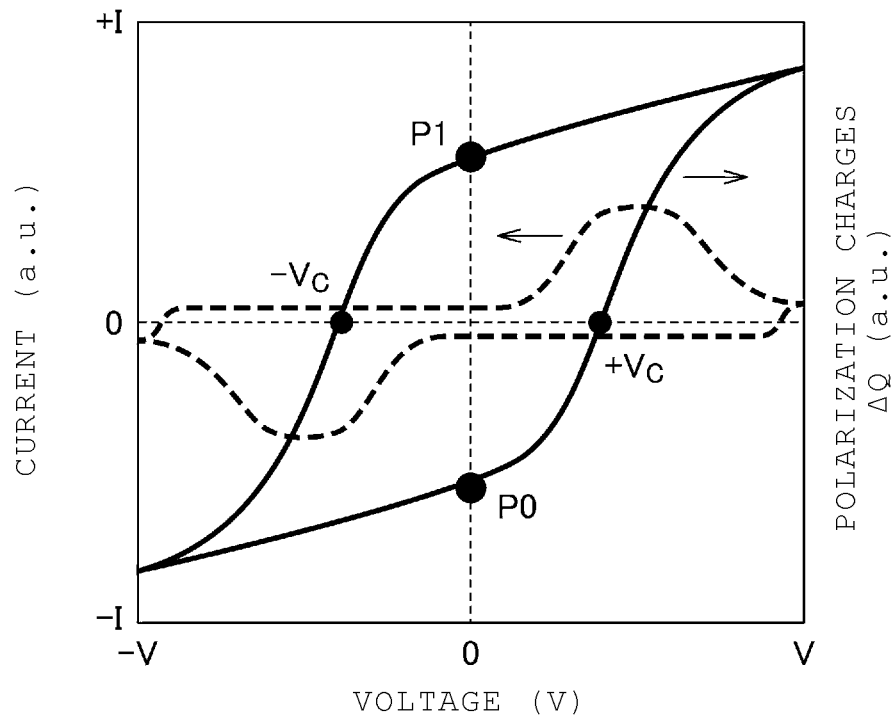
FIG. 1 is a diagram illustrating current-voltage characteristics and polarization characteristics of a ferroelectric substance.

Embodiments provide a nonvolatile semiconductor memory with high cycle durability and a manufacturing method therefor capable of enlarging a memory window.

In general, according to one embodiment, a nonvolatile semiconductor memory includes a memory cell including: a core structure extending in a first direction orthogonal to a semiconductor substrate; a semiconductor layer extending in the first direction and in contact with the core structure; an insulating layer extending in the first direction and in contact with the semiconductor layer; a ferroelectric layer extending in the first direction and in contact with the insulating layer; a first electrode extending in a second direction orthogonal to the first direction and in contact with the ferroelectric layer; a second electrode adjacent to the first electrode in the first direction, extending in the second direction, and in contact with the ferroelectric layer; an insulating layer stacked in the first direction and disposed between the first and second electrodes; and an antiferroelectric layer disposed between the first and second electrodes, and in contact with the insulating layer and the ferroelectric layer.

Hereinafter, embodiments will be described with reference to the drawings. In the following description, the same reference numerals are given to the same or similar members or the like, and the members or the like described once will not be described as appropriate.

In the following description, a direction perpendicular to a semiconductor substrate growing on an XY plane is referred to as a Z direction, a direction orthogonal to the Z direction and extending in a word line WL is referred to as an X direction, and a direction in which the bit line BL perpendicular to the Z and X directions extends is referred to as a Y direction.

In the present specification, quantitative analysis and qualitative analysis for chemical compositions of members provided in a nonvolatile semiconductor memory can be performed with, for example, a secondary ion mass spectroscopy (SIMS) or an energy dispersive X-ray spectroscopy (EDX). When thicknesses of the members provided in the nonvolatile semiconductor memory, distances between members, and the like are measured, for example, a transmission electron microscope (TEM) can be used. In identification of a crystalline system of the members provided in the nonvolatile semiconductor memory and magnitude comparison of existence ratios of the crystalline system, for example, electron diffraction can be used.

In the present specification, an "antiferroelectric substance" is a substance in which an electric dipole moment is cancelled as a whole although positive and negative ions are displaced although there is no electric field. The "ferroelectric substance" is a substance in which there is spontaneous polarization although an electric field is not applied from the outside, and polarization is reversed when an electric field is applied from the outside.

(Characteristic Examples of Ferroelectric Substance and Antiferroelectric Substance)

The ferroelectric memory writes data to a memory cell and erases data from a memory cell by using polarization reversal of the ferroelectric substance.

For example, in 3-terminal ferroelectric memories (nonvolatile semiconductor memories according to first and second embodiments) to be described below, a polarization reversal state of a gate insulating layer of a memory cell transistor is controlled with a voltage applied between a gate electrode and a semiconductor layer. A threshold voltage of the memory cell transistor is changed in accordance with a polarization reversal state of the gate insulating layer.

When the threshold voltage of the memory cell transistor is changed, a drain current of the memory cell transistor is changed. For example, when a state in which the threshold voltage is high and an ON current is low is defined as "0" and a state in which the threshold voltage is low and an ON current is high is defined as "1", the memory cell can store 1-bit data of "0" and "1".

In the 3-terminal ferroelectric memory, it is desirable that a difference between a threshold voltage after writing which is a state in which the ON current is low and a threshold voltage in reading which is a state in which the ON current is high, a so-called a memory window (MW) is enlarged.

FIG. 1 is a diagram illustrating current-voltage characteristics and polarization characteristics of the ferroelectric substance. The current-voltage characteristics are indicated by a broken line and the polarization characteristics are indicated by a solid line. The polarization characteristics represent a relationship between polarization charges $\Delta Q$ and a voltage (V), and are expressed as an integrated value of the current-voltage characteristics. In the current-voltage characteristics of the ferroelectric substance, one current peak is shown in each of a positive voltage side and a negative voltage side, and by reflecting the characteristics, it is possible to obtain polarization characteristics illustrated in FIG. 1. In FIG. 1, P1 and P0 indicate polarization charges $\Delta Q$ at a voltage of 0 V. $-Vc$ and $+Vc$ respectively indicate a negative voltage value and a positive voltage value at which a current I becomes zero.

Figure 2:
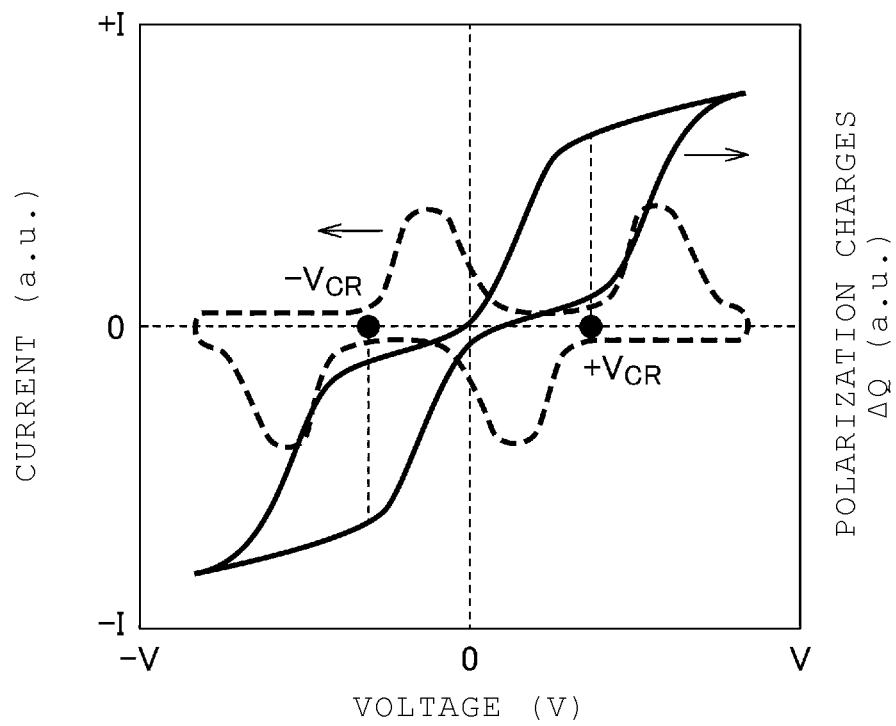
FIG. 2 is a diagram illustrating current-voltage characteristics and polarization characteristics of an antiferroelectric substance.

FIG. 2 is a diagram illustrating current-voltage characteristics and polarization characteristics of an antiferroelectric substance. The current-voltage characteristics are indicated by a broken line and the polarization characteristics are indicated by a solid line. In the current-voltage characteristics of the antiferroelectric substance, two current peaks are shown in each of a positive voltage side and a negative voltage side, and by reflecting the characteristics, it is possible to obtain polarization characteristics illustrated in FIG. 2. In FIG. 2, polarization charges $\Delta Q$ at a voltage of 0 V indicate substantially zero.

In the case of the ferroelectric substance, an electric field is intensified and polarization is increased. Thus, even when the electric field is zero, polarization close to a maximum value remains.

The residual polarization is major characteristics of the ferroelectric substance and is also a principle of a nonvolatile memory. On the other hand, in the case of the antiferroelectric substance, an electric field is intensified and polarization is increased. However, when the electric field is zero, the polarization becomes nearly zero. There is no residual polarization. Here, when the electric field is intensified, the polarization is seldom large. When the electric field is maximized and gradually weakened, the polarization seldom becomes small. There is a hysteresis (history) effect. Therefore, a curve made by the voltage and the polarization charges $\Delta Q$ has a shape in which two rhombuses are connected (also referred to as a "butterfly curve").

(Cycle Characteristics of Ferroelectric Substance)

In an experimental result of cycle characteristics indicating a relationship between the number of cycles and the polarization charges $\Delta Q$ of the ferroelectric substance that has HZO as a main component, polarization reversal charges decrease with an increase in the number of cycles. Thus, the polarization reversal charges decreased by 10% at about 100 K times. A domain (polarization-fatigue domain) in which polarization reversal does not arise with electric stress is not reversed even when a high voltage is applied. Therefore, a ratio of a domain in which polarization is reversed with an increase in the number of cycles decreased.

As a method of improving an increase in the ratio of the domain in which the polarization is not reversed, the present inventors have confirmed that cycle durability has been improved by forming a state in which a domain of an antiferroelectric substance is mixed in a ferroelectric substance.

In a ferroelectric memory, a memory window (MW) is lost due to deterioration in a ferroelectric film. However, by mixing a domain of an antiferroelectric substance with a ferroelectric substance in the ferroelectric film, it is possible to improve the cycle durability and enlarge the memory window. By enlarging the memory window, for example, an operation of the ferroelectric memory is stabilized.
(Method of Improving Cycle Durability)
(Cycle Characteristics of Mixture State of Ferroelectric Substance and Antiferroelectric Substance)

Figure 3A:
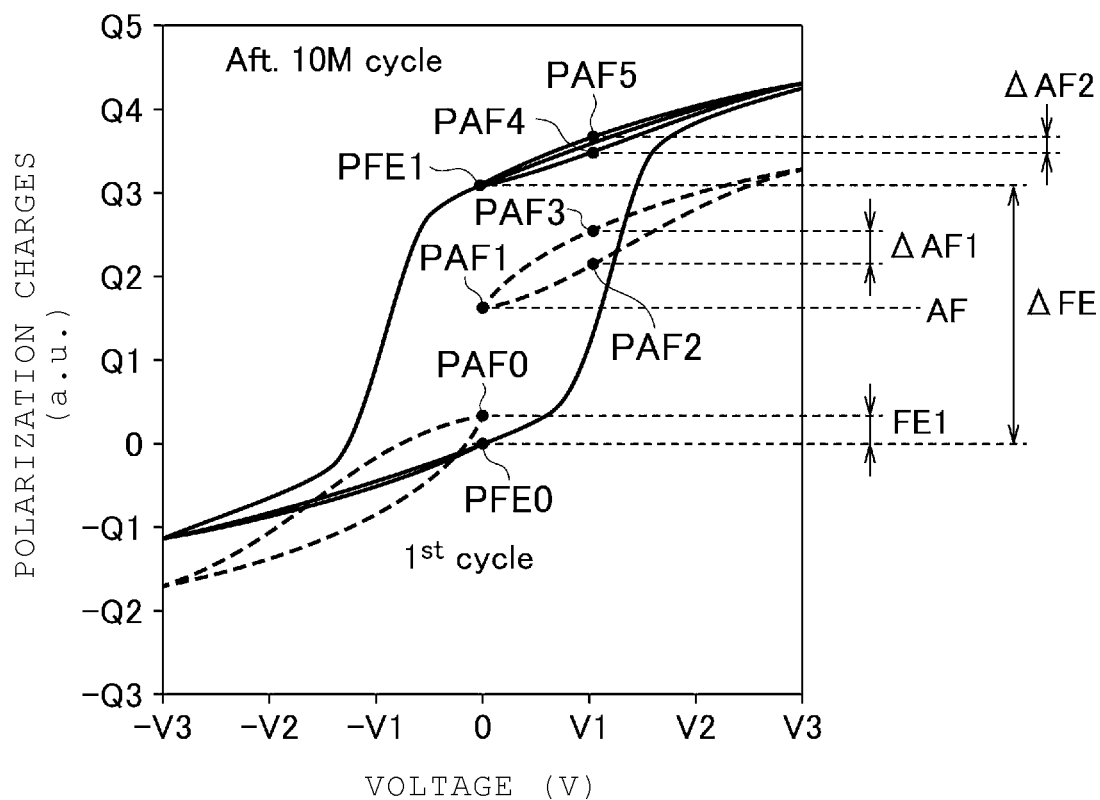
FIG. 3A is a diagram illustrating a polarization characteristic example when the number of cycles=1 time and the number of cycles=10 M times in a ferroelectric substance and an antiferroelectric substance.

FIG. 3A is a diagram illustrating a polarization characteristic example when the number of cycles=1 time and the number of cycles=10 M times in a ferroelectric substance and an antiferroelectric substance. A broken line indicates polarization characteristic of the antiferroelectric substance in the case of the number of cycles=1 time. A solid line indicates polarization characteristics of the ferroelectric substance and the antiferroelectric substance in the case of the number of cycles=10 M times. The polarization characteristic of the ferroelectric substance in the case of the number of cycles=1 time is not illustrated. The polarization characteristics of the ferroelectric substance and the antiferroelectric substance in the case of the number of cycles=10 M times correspond to characteristics after the wakeup.

At an applying voltage of 0 V, PAF0 and PAF1 correspond to residual polarization in a mixture state of the ferroelectric substance and the antiferroelectric substance in the case of the number of cycles=1 time. PFE0 and PFE1 correspond to residual polarization in a mixture state of the ferroelectric substance and the antiferroelectric substance in the case of the number of cycles=10 M times.

At an applying voltage of 0 V, a difference ΔFE between PFE0 and PFE1 also indicates an increase in polarization charges of the ferroelectric substance in the case of the number of cycles=10 M times. As illustrated in FIG. 3A, ΔFE increases with an increase in the number of cycles.

At an applying voltage of V1, a difference ΔAF1 between PAF2 and PAF3 also indicates an increase in polarization charges of the ferroelectric substance in the case of the number of cycles=1 time. At an applying voltage of V1, a difference ΔAF2 between PAF4 and PAF5 also indicates an increase in polarization charges of the antiferroelectric substance in the case of the number of cycles=10 M times. As illustrated in FIG. 3A, the number of cycles increases and an increase in the polarization charges of the antiferroelectric substance decrease because ΔAF2<ΔAF1. In this way, because of an increase in the applying voltage and/or the number of cycles, polarization reversal in a domain in which there has been no residual polarization and the polarization has not been reversed, a decrease in the polarization charges of the antiferroelectric substance, and an increase in the polarization charges of the ferroelectric substance are referred to as wakeup.

Figure 3B:
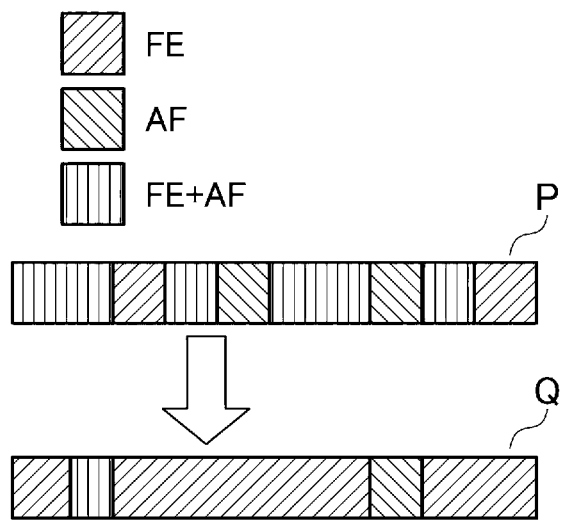
FIG. 3B is a diagram illustrating an advantage of wakeup characteristics of a ferroelectric substance and an antiferroelectric substance.

FIG. 3B is a diagram illustrating an advantage of wakeup characteristics of a ferroelectric substance and an antiferroelectric substance. P and Q schematically show a state of a domain before and after the wakeup. FE indicates a domain region of a ferroelectric substance and AF indicates a domain region of an antiferroelectric substance. FE+AF indicates a domain region in a mixture state of a ferroelectric substance and an antiferroelectric substance. When the number of cycles is increased by the wakeup in the mixture state of the ferroelectric substance and the antiferroelectric substance, the mixture state FE+AF of the ferroelectric substance and the antiferroelectric substance decrease, the domain region FE of the ferroelectric substance increases, and the domain region AF of the antiferroelectric substance decreases. Here, the domains are the domain region FE of the ferroelectric substance and the domain region AF of the antiferroelectric substance, and are crystalline grains of polycrystalline, and a size is, for example, about 30 nm to 40 nm. The domain region FE of the ferroelectric substance and the domain region AF of the antiferroelectric substance are crystalline gains in which the polarization is reversed. Adjacent installation of the domain of the antiferroelectric substance in the ferroelectric film is adjacent installation of other crystalline gains.
(Current-Voltage Characteristics of Antiferroelectric Substance)

Figure 4:
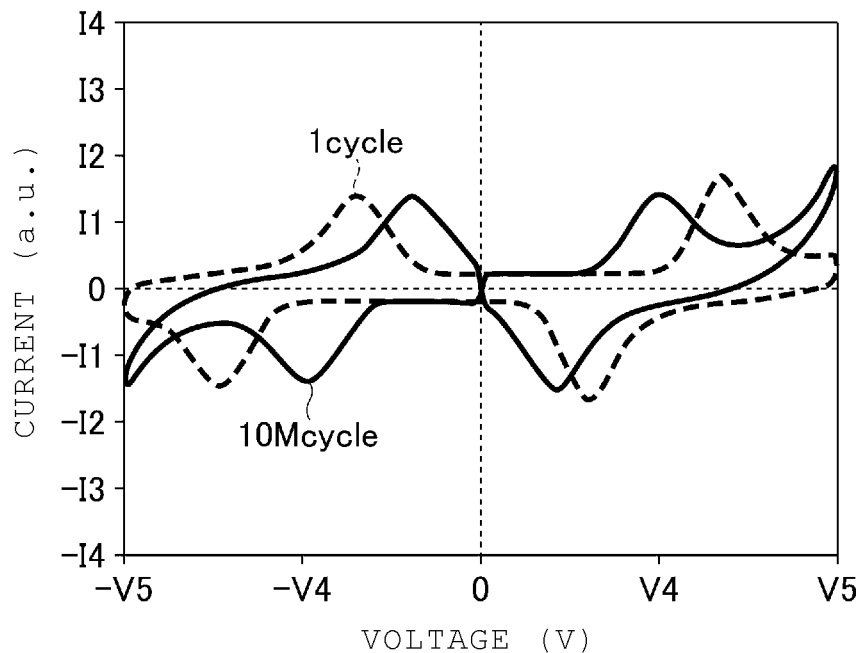
FIG. 4 is a diagram illustrating a current-voltage characteristic example of an antiferroelectric substance (an experimental result) (a broken line: an example of the number of cycles=1 time, and a solid line: an example of the number of cycles=10 M times)

FIG. 4 is a diagram illustrating a current-voltage characteristic example (experimental result) of an antiferroelectric substance. A broken line is an example of the number of cycles=1 time and a solid line is an example of the number of cycles=10 M times.

When current-voltage characteristics were measured using the number of cycles as a parameter in an HZO film, insulation breakdown in the number of cycles of 10 M times was confirmed. Meanwhile, as a result obtained by adding Si to the HZO film in a range of 1% or more and 6% or less, as illustrated in FIG. 4, current-voltage characteristics of a general antiferroelectric substance could be obtained. Further, current-voltage characteristics were measured using the number of cycles as a parameter. As illustrated in FIG. 4, insulation breakdown did not occur even in the number of cycles of 10 M times and current-voltage characteristics of a good antiferroelectric substance could be obtained. When Si was added excessively to an HZO film, it was confirmed that antiferroelectric characteristics were lost.

As an experimental result of the present inventors, it was confirmed that an antiferroelectric substance could be stably crystallized by adding Si to an HZO film in the range of 1% or more and 6% or less. It was confirmed that the HZO to which Si was added exhibited antiferroelectricity and a breakdown voltage was improved compared to an HZO to which Si was not added.
(Method of Forming Antiferroelectric Layer)

An antiferroelectric substance can be stably crystallized by adding Si or Al to an HZO film which is a ferroelectric substance in the range of 1% or more and 6% or less. A crystalline state of the antiferroelectric substance is good, leakage characteristics are improved, and breakdown voltage characteristics are improved. When an HZO film is formed, Si or Al can be formed in a layer form by atomic layer deposition (ALD). In an example according to a second embodiment to be described below, Si may also be added to an HZO by thermal diffusion of Si from the insulating layer 14 containing SiO or SiN.

The present inventors have carried out various experiments and have found that, in the nonvolatile semiconductor memory according to the embodiment, in a structure in which ferroelectric substances are separately adjacent, it is preferable to form a ferroelectric film as an oxide that has Hf and Zr as main components, form an antiferroelectric film as an oxide that has Hf and Zr as main components, and a density of Si, Al, Ge, or Ga is higher in the antiferroelectric film in the range of 1% or more and 6% or less than in the ferroelectric film.

Figure 5:
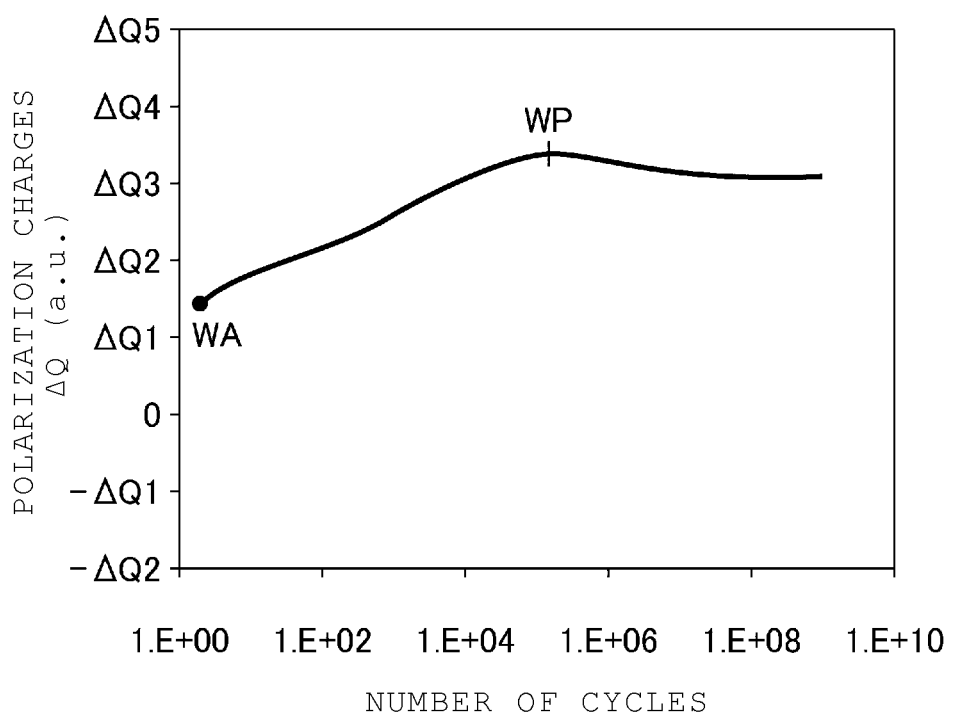
FIG. 5 is a diagram illustrating a cycle characteristic example of a mixture state of a ferroelectric substance and an antiferroelectric substance (an experimental result) (WA: wakeup in the case of the number of cycles=about 1 time and WP: wakeup in the case of the number of cycles=about 100 K times)

FIG. 5 is a diagram illustrating a cycle characteristic example of a mixture state of a ferroelectric substance and an antiferroelectric substance. When an applying voltage is constant 3 V, WA corresponds to a wakeup state in the case of the number of cycles=about 1 time and WP corresponds to a wakeup in the case of the number of cycles=about 100 K times. The number of cycles increases from WA to WP and the polarization charges ΔQ gradually increase. As the number of cycles increases, the domain region AF of the antiferroelectric substance tends to decrease and the domain region FE of the ferroelectric substance tends to increase. From the result illustrated in FIG. 5, it can be understood that high cycle durability can be obtained because the polarization charges ΔQ are substantially constantly held in a state in which a voltage is held at 3 V after the number of cycles=100 K times. As illustrated in FIG. 5, it was confirmed that ΔQ3(a.u.) could be attained at the number of cycles=1 G times by forming a mixture state of a ferroelectric substance and an antiferroelectric substance. It has been confirmed that a domain region which becomes ferroelectric by wakeup was held even after two weeks and was stably reversed even after the number of cycles=1 G times. To accelerate a wakeup state WP in the case of the number of cycles=about 100 K times, an applying voltage can be further increased to a predetermined value or more. To accelerate the wakeup at a voltage, an initialization operation of stabilizing polarization reversal charges may be performed at a high voltage and a memory operation may be performed at a low voltage. Accordingly, it is possible to reduce the number of cycles of the wakeup (the initialization operation).

To form the mixture state of the ferroelectric substance and the antiferroelectric substance, it is possible to enlarge the memory window and provide a nonvolatile semiconductor memory of high cycle durability by using a structure in which ferroelectric substances are separately adjacent.

To form the mixture state of the ferroelectric substance and the antiferroelectric substance, a region where Si is locally added to an HZO layer in the range of 1% or more and 6% or less and a region where Si is not locally added may be mixed. As will be described below, Si may be formed in a layer form.

First Embodiment

Figure 6:
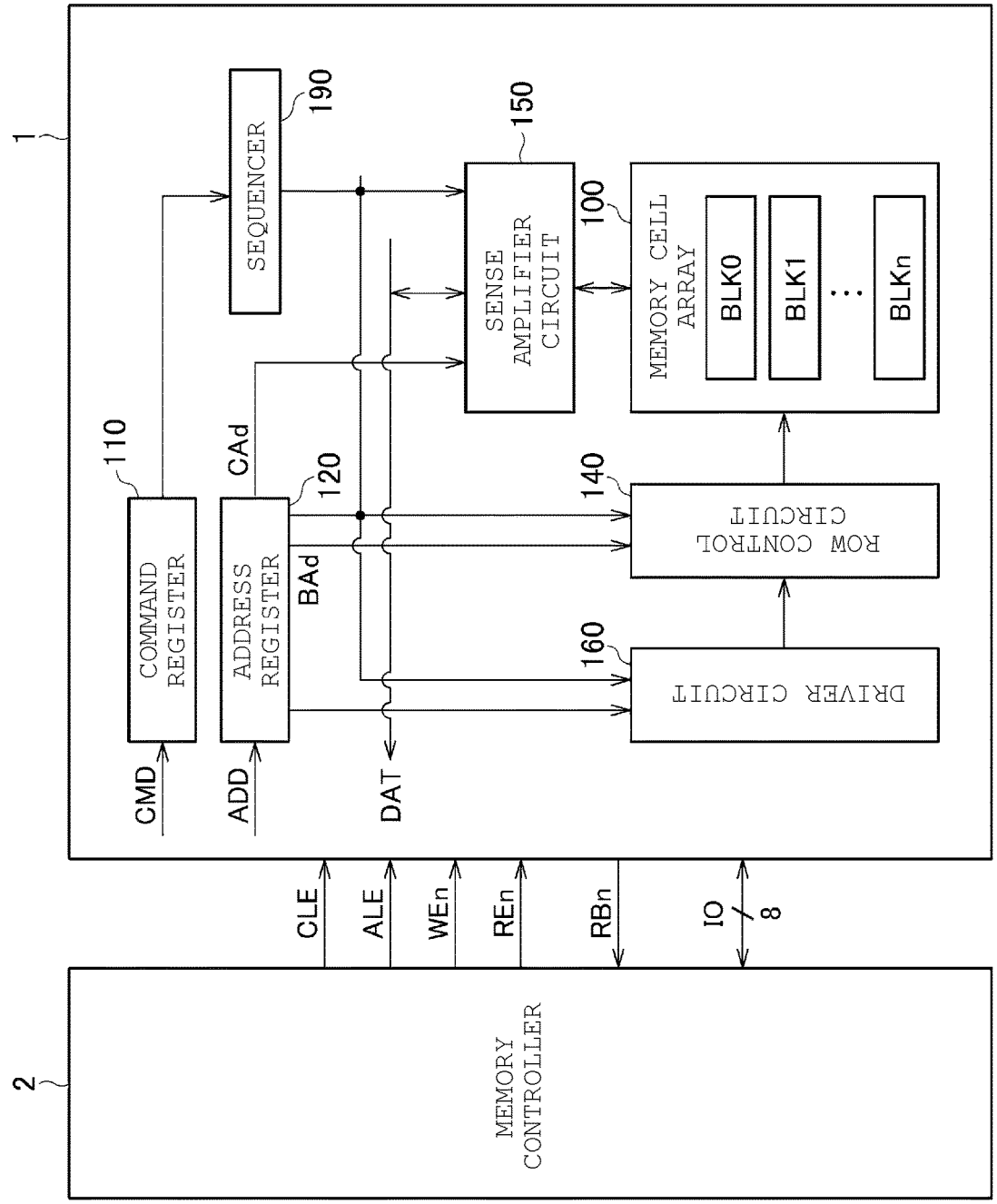
FIG. 6 is a block diagram illustrating a nonvolatile semiconductor memory according to a first embodiment.

FIG. 6 is a block diagram illustrating a configuration example of a nonvolatile semiconductor memory 1 according to a first embodiment. As illustrated in FIG. 6, the nonvolatile semiconductor memory 1 according to the first embodiment is electrically coupled to a memory controller 2.

The memory controller 2 transmits a command CMD, address information ADD, and various control signals CNT to the nonvolatile semiconductor memory 1 according to the first embodiment.

The nonvolatile semiconductor memory 1 receives the command CMD, the address information ADD, and the various control signals CNT. Data DAT is transmitted between the nonvolatile semiconductor memory 1 and the memory controller 2. Hereinafter, the data DAT transmitted from the memory controller 2 to the nonvolatile semiconductor memory 1 in a write operation is referred to as write data. The write data DAT is written in the nonvolatile semiconductor memory 1. The data DAT transmitted from the nonvolatile semiconductor memory 1 to the memory controller 2 in a read operation is referred to as read data. The read data DAT is read from the nonvolatile semiconductor memory 1.

The nonvolatile semiconductor memory 1 according to the first embodiment includes, for example, a memory cell array 100, a command register 110, an address register 120, a row control circuit 140, a sense amplifier circuit 150, a driver circuit 160, and a sequencer 190.

The memory cell array 100 stores data. In the memory cell array 100, a plurality of bit lines and a plurality of word lines are provided. The memory cell array 100 includes a plurality of blocks BLK0 to BLKn (where n is an integer of 1 or more). The blocks BLK are a set of a plurality of memory cells. Each memory cell is associated with one bit line and one word line. A configuration of the memory cell array 100 will be described below.

The command register 110 stores the command CMD from the memory controller 2. The command CMD includes, for example, commands to perform a read operation, a write operation, an erasing operation, and the like on the sequencer 190.

The address register 120 stores the address information ADD from the memory controller 2. The address information ADD includes, for example, a block address, a page address, and a column address. For example, the block address, the page address, and the column address are used to select a block BLK, a word line, and a bit line, respectively. Hereinafter, a block selected based on a block address is referred to as a select block. A word line selected based on a page address is referred to as a select word line.

The row control circuit 140 controls an operation related to a row of the memory cell array 100. The row control circuit 140 selects one block BLK in the memory cell array 100 based on a block address in the address register 120. The row control circuit 140 transmits, for example, a voltage applied to a wiring corresponding to the selected word line to a select word line in the select block BLK.

The sense amplifier circuit 150 controls an operation related to columns of the memory cell array 100. The sense amplifier circuit 150 applies a voltage to each of the bit lines BL provided in the memory cell array 100 in accordance with the write data DAT from the memory controller 2 in a write operation. The sense amplifier circuit 150 determines data stored in the memory cell MC based on a potential (or whether a current is generated) of the bit line BL in a read operation. The sense amplifier circuit 150 transmits the data which is based on the determination result as read data to the memory controller 2.

The driver circuit 160 outputs a voltage used for a read operation, a write operation, an erasing operation, or the like to the memory cell array 100. The driver circuit 160 applies a predetermined voltage to wirings corresponding to a word line and a bit line based on the addresses in the address register 120.

The sequencer 190 controls an operation of the entire nonvolatile semiconductor memory 1. For example, the sequencer 190 controls each circuit based on the command CMD in the command register 110.

For example, communication between the nonvolatile semiconductor memory 1 and the memory controller 2 is supported by a NAND interface standard. In this case, a command latch enable signal CLE, an address latch enable signal ALE, a write enable signal WEn, a read enable signal REn, a ready busy signal RBn, and an input/output signal IO are used in the communication between the nonvolatile semiconductor memory 1 and the memory controller 2.

The command latch enable signal CLE is a signal indicating that the input/output signal IO received by the nonvolatile semiconductor memory 1 is the command CMD. The address latch enable signal ALE is a signal indicating that the signal IO received by the nonvolatile semiconductor memory 1 is the address information ADD. The write enable signal Wen is a signal for commanding the nonvolatile semiconductor memory 1 to input the input/output signal IO. The read enable signal REn is a signal for commanding the nonvolatile semiconductor memory 1 to output the input/output signal IO.

The ready busy signal RBn is a signal for notifying the memory controller 2 whether the nonvolatile semiconductor memory 1 is in a ready state in which a command is received from the memory controller 2 or a busy state in which a command is not received. The input/output signal IO is, for example, an 8-bit signal and may include the command CMD, the address information ADD, and the data DAT.

The nonvolatile semiconductor memory 1 may further include an input/output circuit (not illustrated) and a voltage generation circuit (not illustrated). The input/output circuit may function as an interface circuit of the nonvolatile semiconductor memory 1 side between the nonvolatile semiconductor memory 1 and the memory controller. The voltage generation circuit generates a plurality of voltages for various operations of the nonvolatile semiconductor memory 1.

(Equivalent Circuit)

Figure 7:
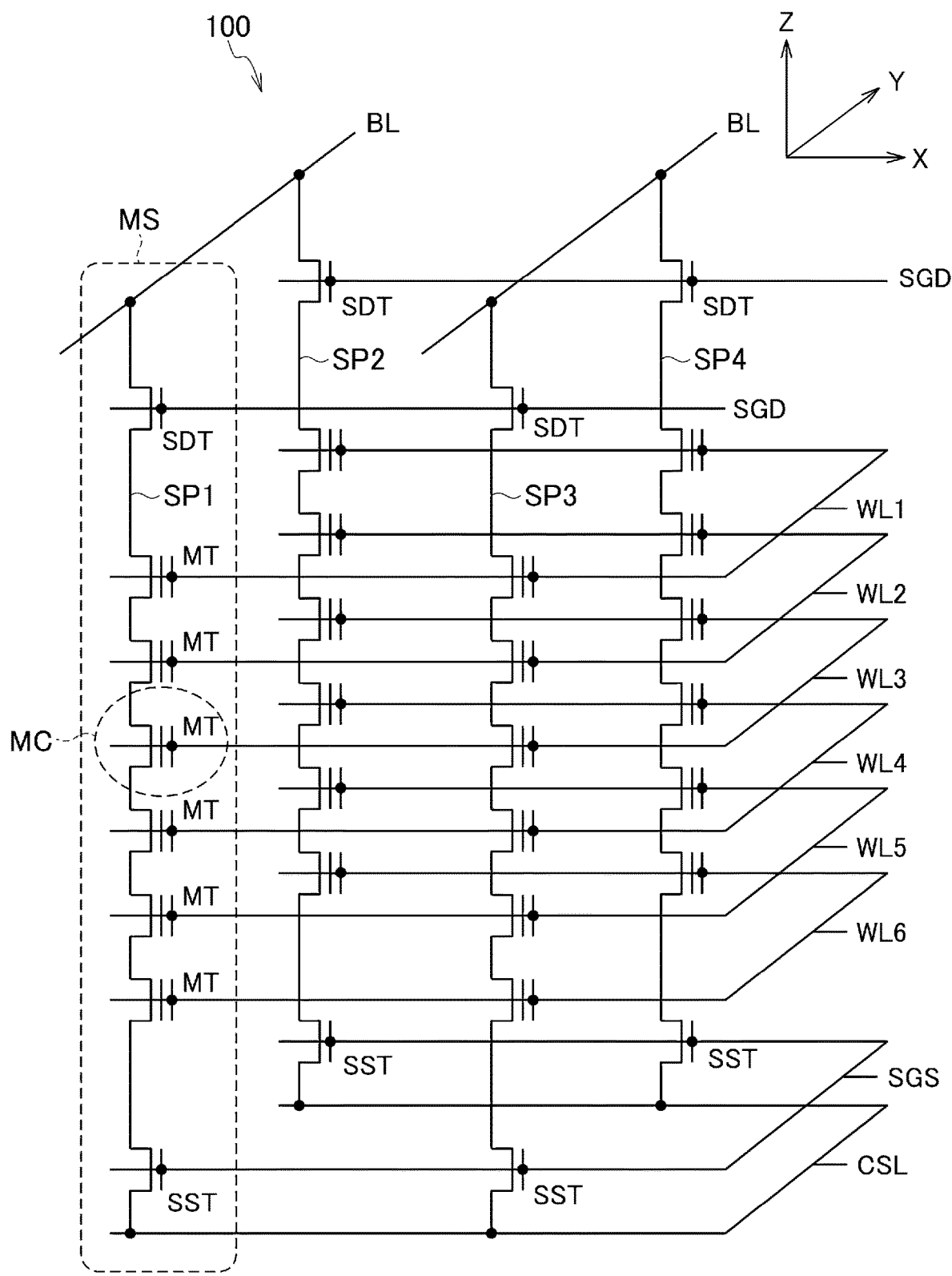
FIG. 7 is an equivalent circuit diagram illustrating a memory cell array of the nonvolatile semiconductor memory according to the first embodiment.

FIG. 7 is an equivalent circuit diagram illustrating the memory cell array 100 of the nonvolatile semiconductor memory according to the first embodiment. The memory cell array 100 has a 3-dimensional structure in which memory cell transistors MT are disposed 3-dimensionally. As illustrated in FIG. 7, the memory cell array 100 includes a plurality of word lines WL including word lines WL1 and WL2, a plurality of semiconductor pillars SP including semiconductor pillars SP1 and SP2, a common source line CSL, a source select gate line SGS, a plurality of drain select gate lines SGD, a plurality of bit lines BL, and a plurality of memory strings MS. As illustrated in FIG. 7, the memory strings MS include source select transistors SST connected in series between the common source line CSL and the bit lines BL, a plurality of memory cell transistors MT, and drain select transistors SDT.

Figure 8:
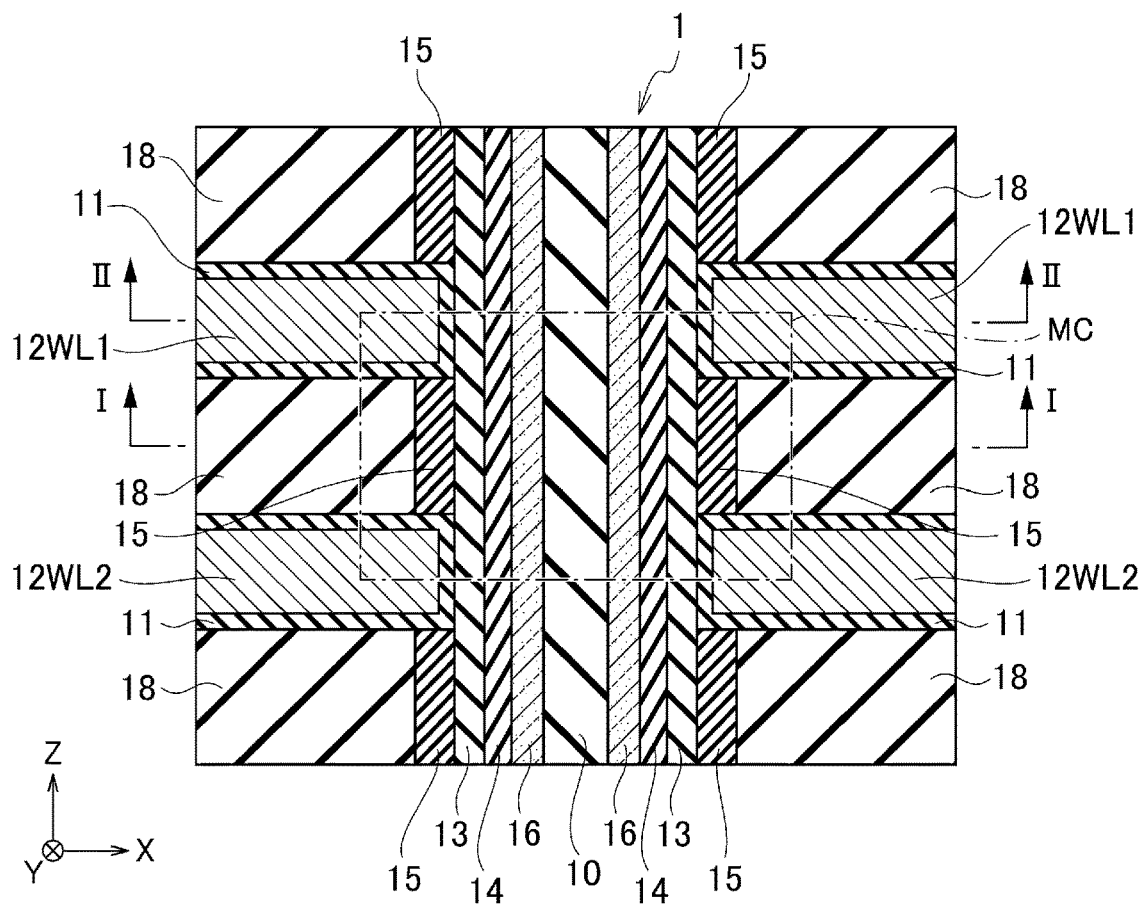
FIG. 8 is a schematic view illustrating a part of the memory cell array of the nonvolatile semiconductor memory according to the first embodiment.
Figure 9:
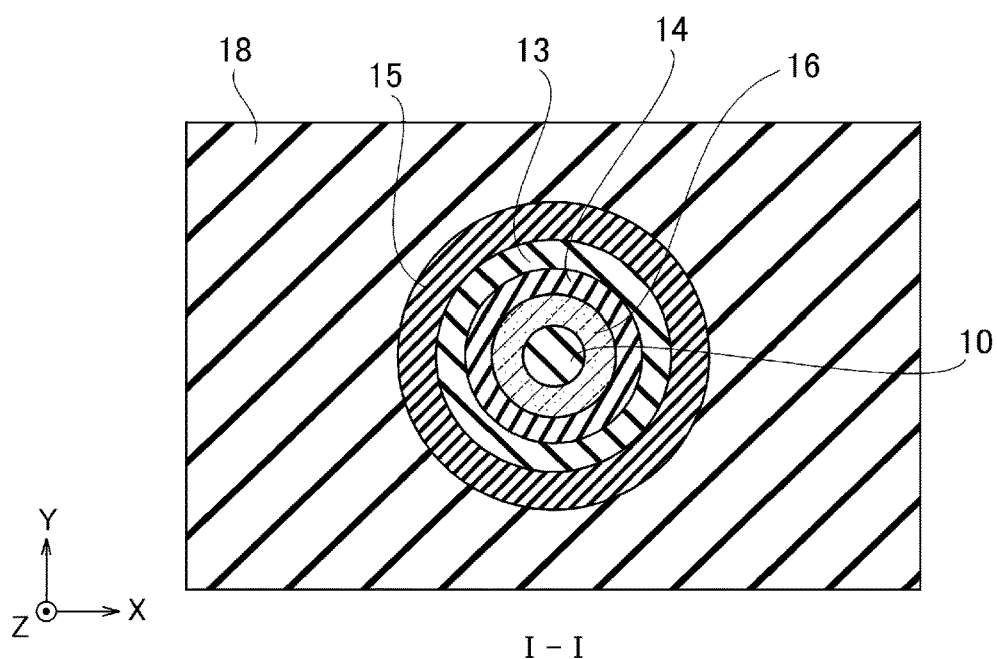
FIG. 9 is a sectional view taken along the line I-I of FIG. 8.
Figure 10:
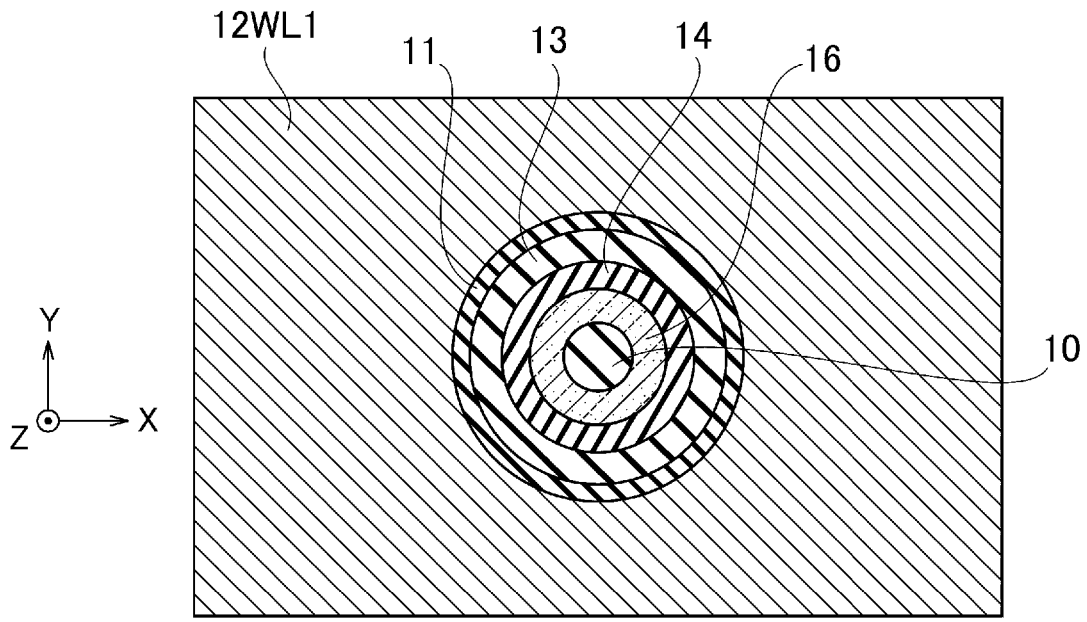
FIG. 10 is a sectional view taken along the line II-II of FIG. 8.

FIG. 8 is a schematic view illustrating a part of the memory cell array of the nonvolatile semiconductor memory 1 according to a first embodiment. FIG. 9 is a sectional view taken along the line I-I of FIG. 8. FIG. 10 is a sectional view taken along the line II-II of FIG. 8.

As illustrated in FIGS. 8 to 10, the nonvolatile semiconductor memory 1 according to the first embodiment includes a memory cell MC including a core unit 10, a semiconductor layer 16, an insulating layer 14, a ferroelectric layer 13, a first potential applying electrode 12WL1, a second potential applying electrode 12WL2, an insulating layer 18, and an antiferroelectric layer 15. The core unit 10 extends in the Z direction orthogonal to a semiconductor substrate (not illustrated). The semiconductor layer 16 extends in the Z direction and comes into contact with the core unit 10. The insulating layer 14 extends in the Z direction and comes into contact with the semiconductor layer 16. The ferroelectric layer 13 extends in the Z direction and comes into contact with the insulating layer 14. The first potential applying electrode 12WL1 extends in the X direction orthogonal to the Z direction and comes into contact with the ferroelectric layer 13. The second potential applying electrode 12WL2 is adjacent to the first potential applying electrode 12WL1 in the Z direction, extends in the X direction, and comes into contact with the ferroelectric layer 13. The insulating layer 18 is stacked in the Z direction, and is disposed between the first potential applying electrode 12WL1 and the second potential applying electrode 12WL2. The antiferroelectric layer 15 is disposed between the first potential applying electrode 12WL1 and the second potential applying electrode 12WL2 and comes into contact with the insulating layer 18 and the ferroelectric layer 13. A region of the ferroelectric layer 13 coming into contact with the antiferroelectric layer 15 may be an antiferroelectric substance influenced by a crystalline structure of the antiferroelectric layer 15 during crystallization. The ferroelectric layer 13 between a channel (the semiconductor layer 16) and the first potential applying electrode 12WL1 or the second potential applying electrode 12WL2 may be a ferroelectric substance, and the ferroelectric layer 13 between the antiferroelectric layer 15 and the channel may be a ferroelectric substance or an antiferroelectric substance.

The first potential applying electrode 12WL1 may come into contact with the ferroelectric layer 13, with a barrier metal layer 11 interposed therebetween. The second potential applying electrode 12WL2 may come into contact with the ferroelectric layer 13, with the barrier metal layer 11 interposed therebetween. The antiferroelectric layer 15 may be disposed between the first potential applying electrode 12WL1 and the second potential applying electrode 12WL2, with the barrier metal layer 11 interposed therebetween.

In the nonvolatile semiconductor memory according to the first embodiment, the ferroelectric layer 13 and the antiferroelectric layer 15 are oxides that both have Hf and Zr as main components. In the antiferroelectric layer 15, a density of Si, Al, Ge, or Ga is higher in a range of 1% or more and 6% or less than in the ferroelectric layer 13.

In the nonvolatile semiconductor memory according to the first embodiment, a crystalline structure of the ferroelectric layer 13 has an orthorhombic crystal as one main component and the crystalline structure of the antiferroelectric layer 15 has a tetragonal crystal as one main component.

As illustrated in FIGS. 8 to 10, the nonvolatile semiconductor memory 1 according to the first embodiment may include the memory cell MC including: the core unit 10 extending in the Z direction; the semiconductor layer 16 extending in the Z direction and having a cylindrical shape covering the outer circumference of the core unit 10; the insulating layer 14 extending in the Z direction and covering the outer circumference of the semiconductor layer 16; the ferroelectric layer 13 extending in the Z direction and covering the outer circumference of the insulating layer 14; the first potential applying electrode 12WL1 extending in the X direction orthogonal to the Z direction and coming into contact with the ferroelectric layer 13; the second potential applying electrode 12WL2 adjacent to the first potential applying electrode 12WL1 in the Z direction, extending in the X direction, and coming into contact with the ferroelectric layer 13; the insulating layer 18 stacked in the Z direction and disposed between the first potential applying electrode 12WL1 and the second potential applying electrode 12WL2; and the antiferroelectric layer 15 disposed between the first potential applying electrode 12WL1 and the second potential applying electrode 12WL2 and coming into contact with the insulating layer 18 and the ferroelectric layer 13.

As illustrated in FIG. 7, the nonvolatile semiconductor memory 1 according to the first embodiment further includes: a first select transistor SDT including the semiconductor layer 16 extending in the Z direction, the insulating layer 14 extending in the Z direction and coming into contact with the semiconductor layer 16, and a third potential applying electrode SGD extending in the X direction and coming into contact with the insulating layer 14; and a memory cell string MS including the first select transistor SDT and the plurality of memory cells MC. The plurality of memory cells MC are connected in series in the Z direction, the first select transistor SDT is connected to one end of the memory cell MC provided at a first end, and a fourth potential applying electrode CSL is connected to one end of the memory cell MC provided at a second end.

As illustrated in FIGS. 6 and 7, the nonvolatile semiconductor memory 1 according to the first embodiment further includes: a fifth potential applying electrode BL connected to the other end of the first select transistor SDT and extending in the Y direction orthogonal to the Z direction and the X direction orthogonal to the Z direction; and the sequencer 190 selectively performing a read operation or a write operation on some of the fifth potential applying electrodes BL among the plurality of fifth potential applying electrodes BL by applying a voltage between the fifth potential applying electrode BL and the fourth potential applying electrode CSL.

The word line WL preferably contains a metal nitride. For example, the word line WL preferably contains a titanium nitride (TiN), a tungsten nitride (WN), or a tantalum nitride (TaN). The word line WL preferably contains, particularly, a titanium nitride (TiN). The word line WL may contain, for example, tungsten (W), tantalum (Ta), niobium (Nb), vanadium (V), iron (Fe), molybdenum (Mo), cobalt (Co), nickel (Ni), ruthenium (Ru), iridium (Ir), copper (Cu), palladium (Pd), silver (Ag), or platinum (Pt).

The bit line BL is preferably a metal from the viewpoint of low resistance. The bit line BL preferably contains tungsten (W) or a titanium nitride (TiN) from the viewpoint of low resistance and consistency with a known manufacturing process for a semiconductor device. The bit line BL may contain, for example, a tungsten nitride (WN), a tantalum nitride (TaN), tantalum (Ta), niobium (Nb), vanadium (V), iron (Fe), molybdenum (Mo), cobalt (Co), nickel (Ni), ruthenium (Ru), iridium (Ir), copper (Cu), palladium (Pd), silver (Ag), or platinum (Pt).

(Manufacturing Method)

In a method of manufacturing the nonvolatile semiconductor memory 1 according to the first embodiment, an opening 54 is formed in a stacked body of the insulating layer 18 and an insulating layer 20, the first amorphous HZO layer 15 is formed on an inner surface of the opening 54 by retreating the insulating layer 18 of the opening 54 by etching, the first HZO layer 15 of the opening 54 is flattened, the first HZO layer 15 is crystallized by a first thermal process, the second amorphous HZO layer 13 is formed on the first HZO layer 15 of the opening 54, and the second HZO layer 13 is crystallized by a second thermal process, and the semiconductor layer 16 and the core unit 10 are sequentially formed on the second HZO layer 13 of the opening 54. Further, in a stacked body 50, the insulating layer 20 is selectively removed by etching and an electrode layer 12 is formed between the insulating layer 18 exposed after the insulating layer 20 is removed.

The insulating layer 14 may be formed on the crystallized second HZO layer 13, the semiconductor layer 16 and the core unit 10 may be formed sequentially on the insulating layer 14, the metal layer 11 may be formed between the insulating layer 18, and the electrode layer 12 may be formed on the metal layer 11. After the semiconductor layer 16 and the core unit 10 are formed, a third thermal process may be performed.

Through a thermal process, an antiferroelectric substance that has an orthorhombic crystal as one main component is formed in the first HZO layer 15 and a ferroelectric substance having a tetragonal crystal as one main component is formed in the second HZO layer 13.

The wakeup can be performed by applying a voltage to the second HZO layer 13. The wakeup may be performed by increasing the number of cycles of polarization reversal on the second HZO layer 13.

Next, a method of manufacturing the nonvolatile semiconductor memory 1 according to the first embodiment will be described. FIGS. 11 to 20 are schematic sectional views illustrating the method of manufacturing the nonvolatile semiconductor memory according to the first embodiment. FIGS. 11 to 20 illustrate a cross-sectional surface corresponding to FIG. 8.

Figure 11:
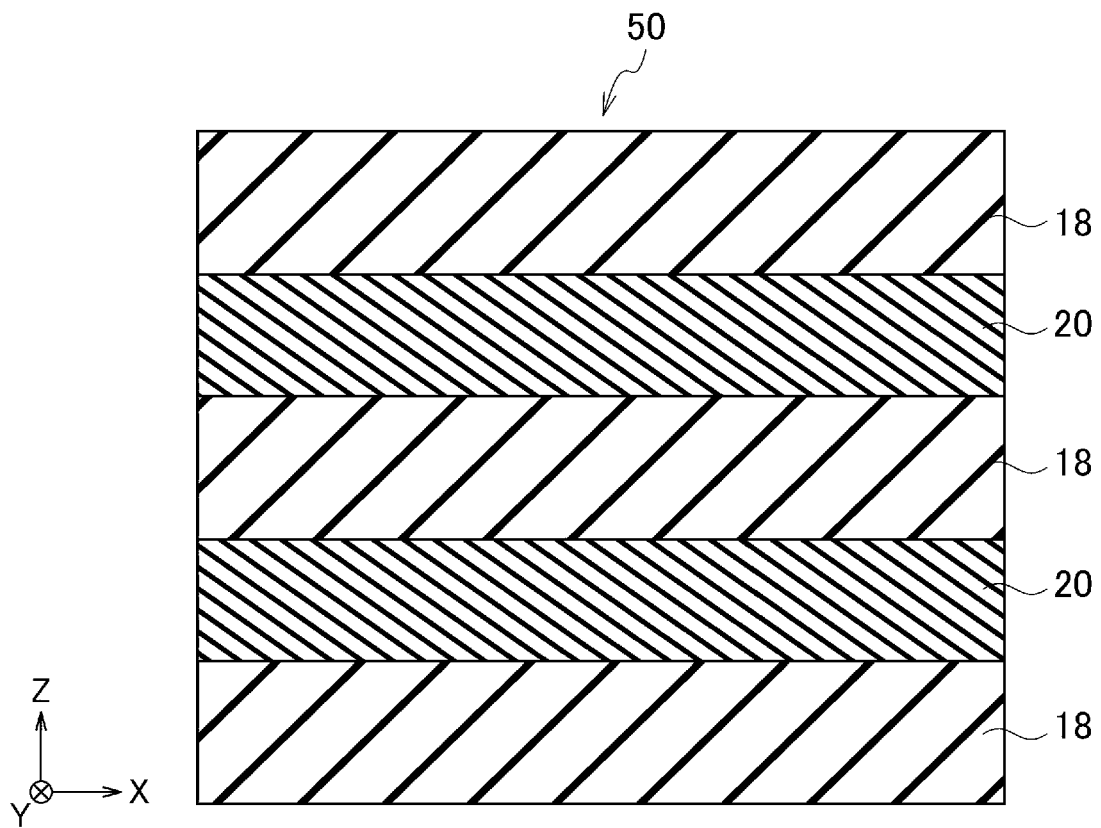
FIG. 11 is a sectional view illustrating an example of a method of manufacturing a nonvolatile semiconductor memory according to the first embodiment.

First, a silicon oxide layer 18 and a silicon nitride layer 20 are alternately stacked on a semiconductor substrate (not illustrated) (FIG. 11). The stacked body 50 is formed by the silicon oxide layer 18 and a silicon nitride layer 20. The silicon oxide layer 18 and a silicon nitride layer 20 are formed by, for example, chemical vapor deposition (CVD). The silicon oxide layer 18 finally becomes an interlayer insulating layer. As will be described below, when W is replaced and formed, the silicon oxide layer 18 and a silicon nitride layer 20 are stacked. When W is not replaced and formed, the silicon oxide layer 18 and a polysilicon layer 0 are stacked. Hereinafter, a manufacturing process when W is replaced and formed will be described.

Figure 12:
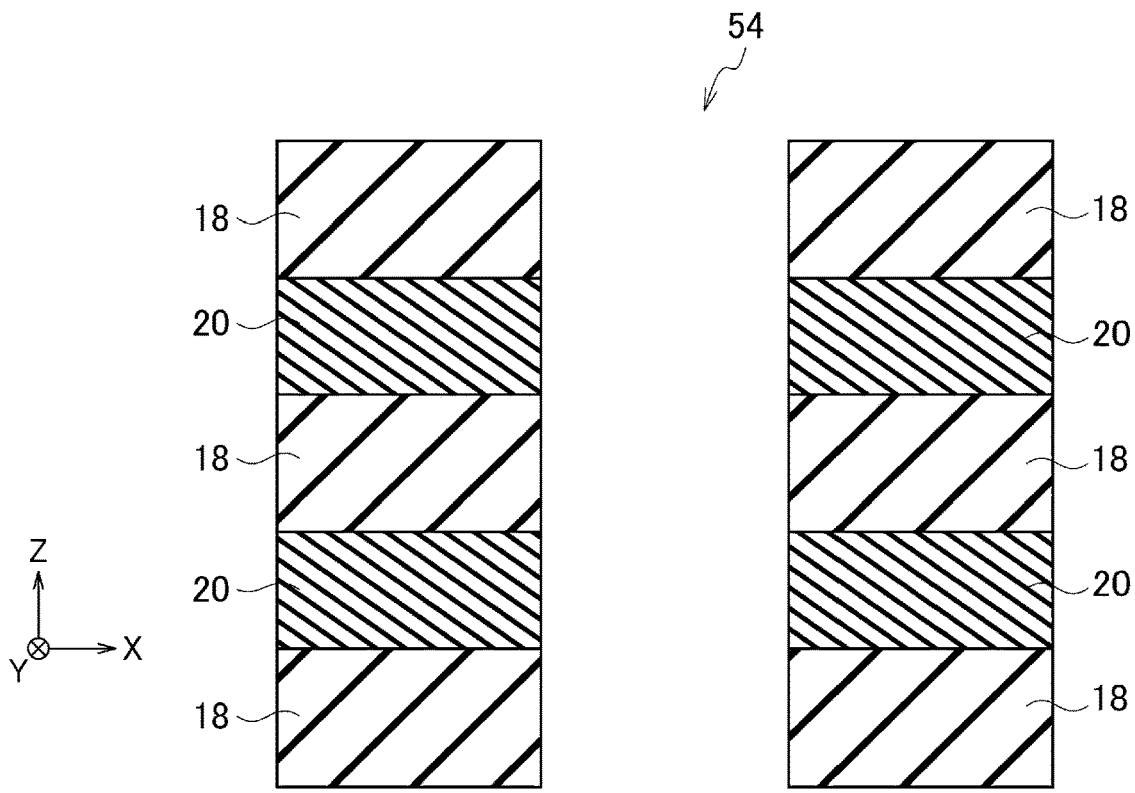
FIG. 12 is a sectional view illustrating the example of the method of manufacturing the nonvolatile semiconductor memory according to the first embodiment.

Subsequently, the opening 54 is formed in the silicon oxide layer 18 and a silicon nitride layer 20 (FIG. 12). The opening 54 is formed by, for example, lithography and reactive ion etching (RIE).

Figure 13:
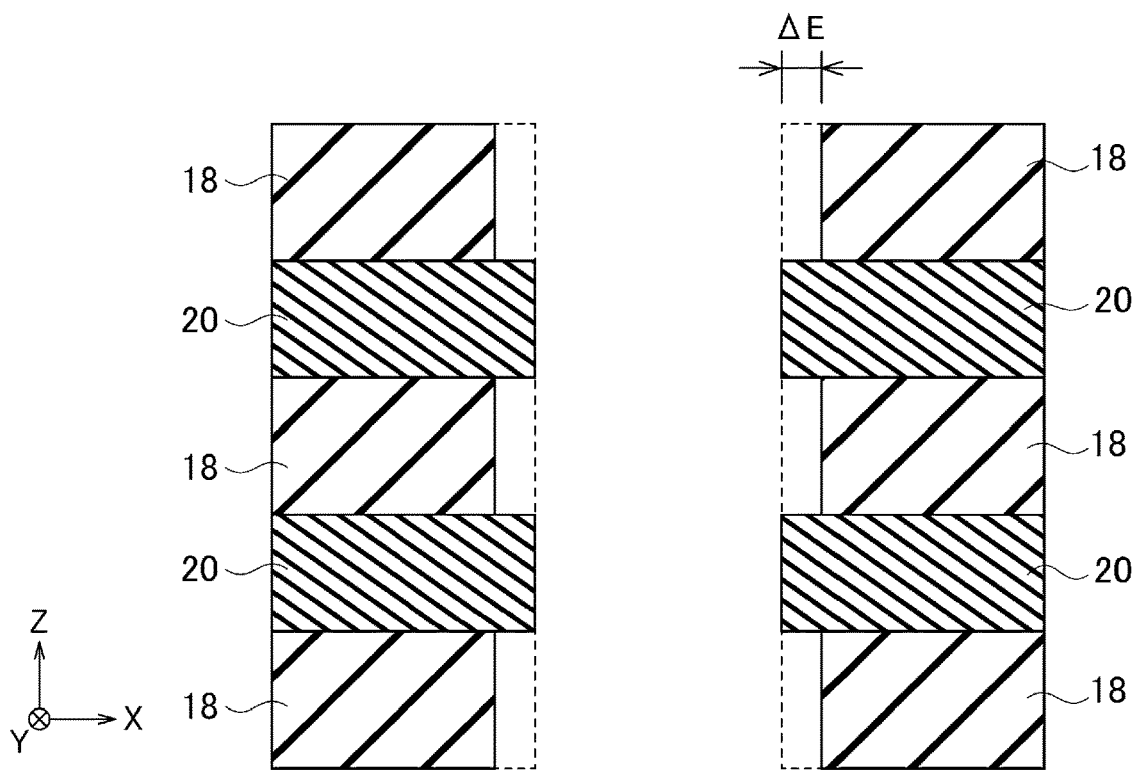
FIG. 13 is a sectional view illustrating the example of the method of manufacturing the nonvolatile semiconductor memory according to the first embodiment.

Subsequently, a thickness of the silicon oxide layer 18 is retreated by etching (FIG. 13). A thickness of a portion in which the silicon oxide layer 18 is retreated is indicated by ΔE.

Figure 14:
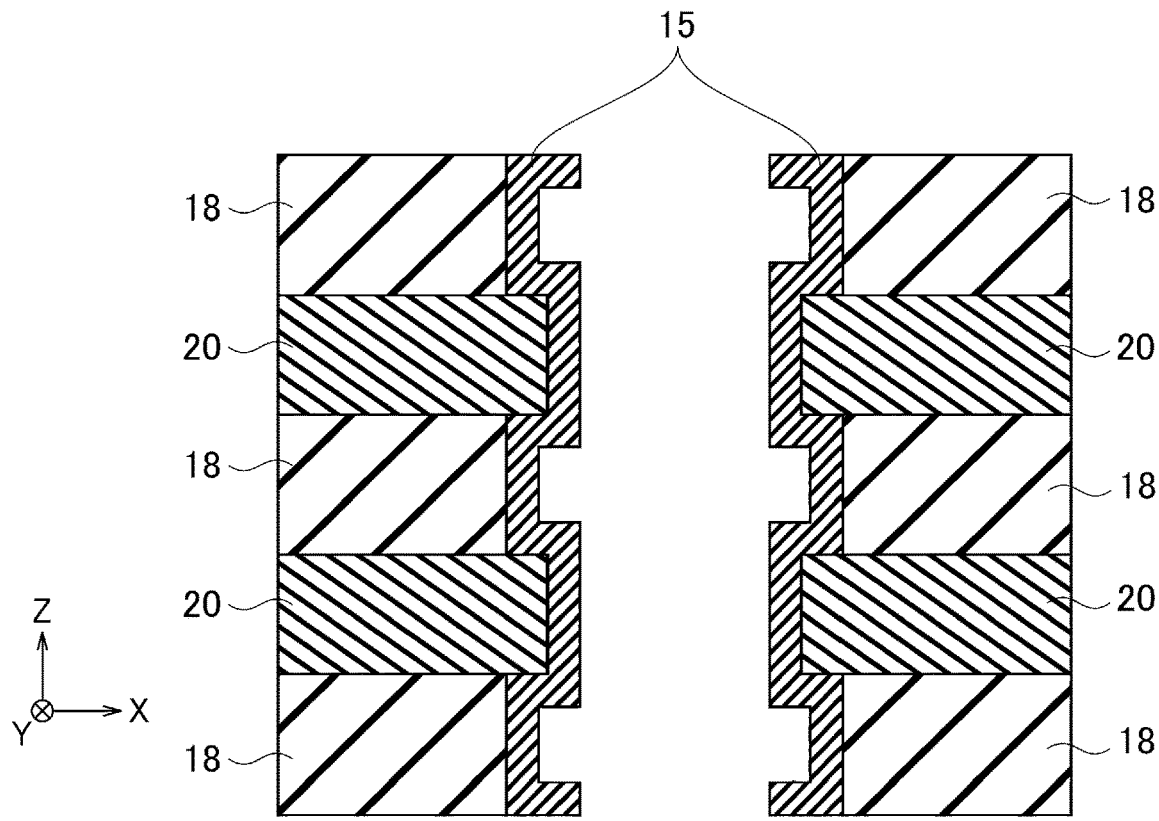
FIG. 14 is a sectional view illustrating the example of the method of manufacturing the nonvolatile semiconductor memory according to the first embodiment.

Subsequently, the antiferroelectric layer 15 is formed on the inner surface of the opening 54 (FIG. 14). The antiferroelectric layer 15 is formed of, for example, HfZrO to which Si is added. Specifically, the antiferroelectric layer 15 is formed of HfZrO to which a density of Si, Al, Ge, or Ga is added in a range of 1% or more and 6% or less. The antiferroelectric layer 15 is formed by, for example, ALD. For example, as a method of adding Si, Hf is formed by ALD and is oxidized, and Zr is formed by ALD and is oxidized. Hf and Zr are stacked by repeating the processes, a layer formed of Si by ALD is formed, and then a thermal process is performed. As a result, the antiferroelectric layer 15 in which Si is added to HfZrO in the range of 1% or more and 6% or less can be formed. In this case, Si is formed in a layer form. The same applies to a method of adding Al, Ge, or Ga.

Figure 15:
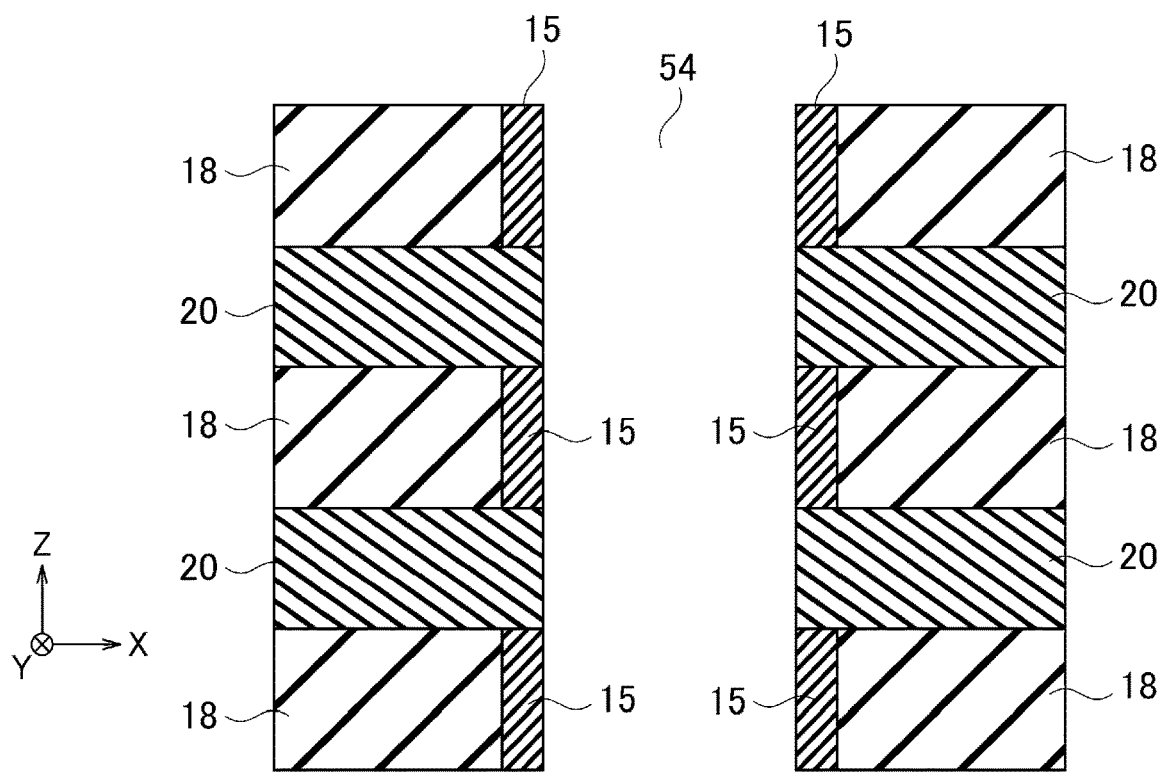
FIG. 15 is a sectional view illustrating the example of the method of manufacturing the nonvolatile semiconductor memory according to the first embodiment.

Subsequently, the antiferroelectric layer 15 on the inner surface of the opening 54 is flattened by a leveling process (FIG. 15). As a result, as illustrated in FIG. 15, the antiferroelectric layer 15 and the silicon nitride layer 20 are flush with each other on the inner surface of the opening 54, and the silicon nitride layer 20 is exposed to the inner surface of the opening 54. The antiferroelectric layer 15 may be formed on the inner surface of the opening, the antiferroelectric layer 15 of the opening may be flattened, and the antiferroelectric layer 15 may be crystallized by a thermal process. A temperature of the thermal process is, for example, about 600° C. to 900° C.

In the foregoing processes, when the antiferroelectric layer 15 is crystallized by the thermal process and then the ferroelectric layer 13 is formed, the ferroelectric layer 13 is formed by a subsequent thermal process by maintaining crystallinity of the antiferroelectric layer 15. Therefore, the antiferroelectric layer 15 can be used as a template. By using the Si-doped or Al-doped antiferroelectric layer 15 as the template, the ferroelectric layer 13 can be formed between only the semiconductor layer 16 and the electrode layer 12 serving as the word line WL. The Si-doped or Al-doped first HZO layer is first crystallized to form the antiferroelectric layer 15. Thereafter, when the second amorphous HZO layer is formed, the second amorphous HZO layer is crystallized with the crystallinity of the antiferroelectric layer 15 maintained to form the ferroelectric layer 13.

Figure 16:
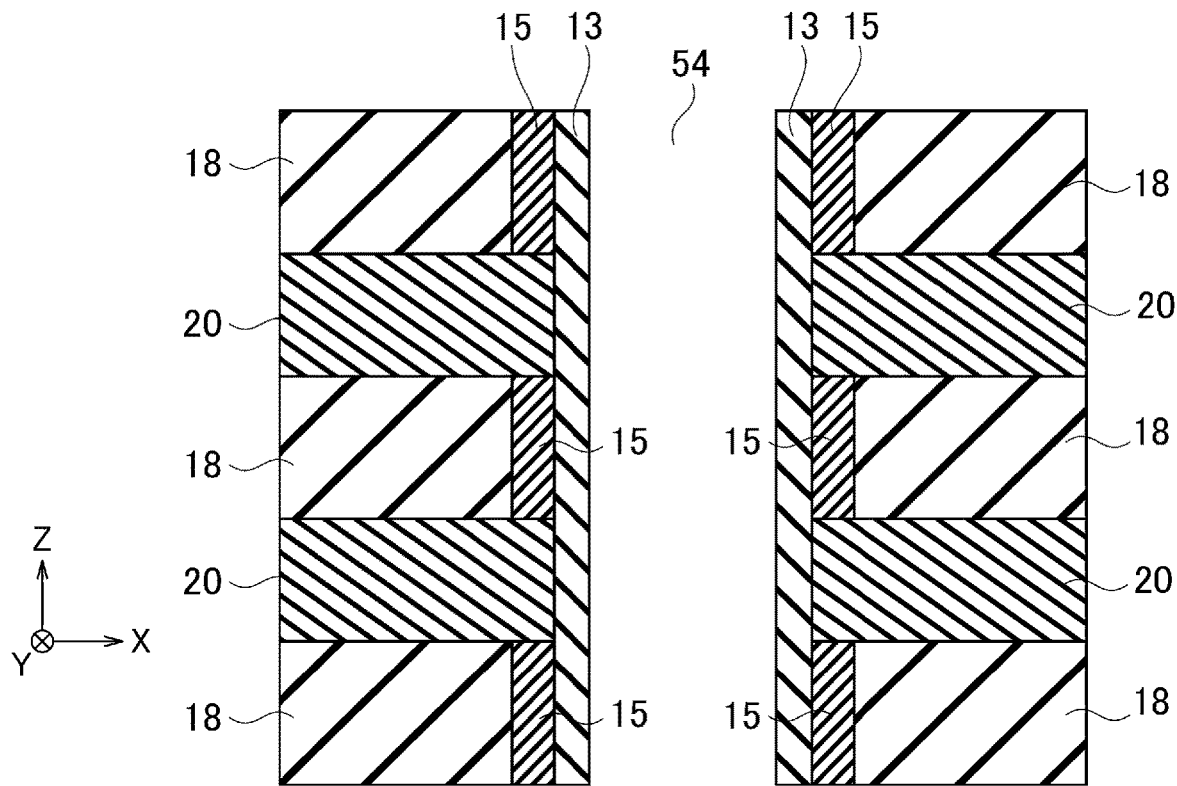
FIG. 16 is a sectional view illustrating the example of the method of manufacturing the nonvolatile semiconductor memory according to the first embodiment.

Subsequently, the ferroelectric layer 13 is formed on the inner surface of the opening 54 (FIG. 16). The ferroelectric layer 13 is formed of, for example, HZO to which Si, Al, or the like is not added. HZO to which Si, Al, or the like is not added is formed as a ferroelectric substance. The ferroelectric layer 13 is also formed by, for example, ALD. The ferroelectric layer 13 is amorphous. The ferroelectric layer 13 finally becomes a gate insulating layer. A temperature at which the ferroelectric layer 13 is formed is, for example, in the range of 150° C. or more and 350° C. or less. The amorphous ferroelectric layer 13 may be crystallized by a thermal process. A temperature of the thermal process is, for example, in the range of about 600° C. or more and 900° C. or less.

Figure 17:
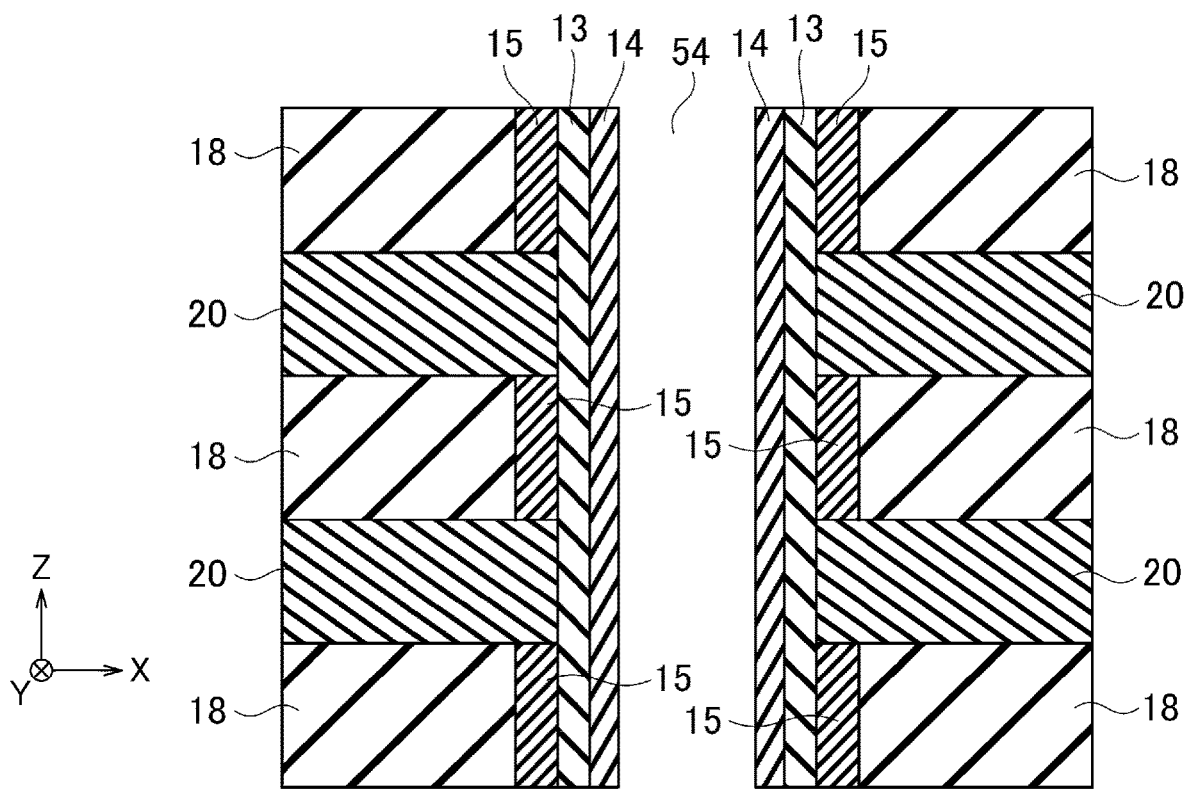
FIG. 17 is a sectional view illustrating the example of the method of manufacturing the nonvolatile semiconductor memory according to the first embodiment.

Subsequently, the insulating layer 14 is formed on the inner surface of the opening 54 (FIG. 17). The insulating layer 14 is formed of a silicon oxide film SiO or a silicon nitride film SiN. The insulating layer 14 is formed by, for example, a CVD method. When the semiconductor layer 16 comes into direct contact with the ferroelectric layer 13 which is HZO to which Si, Al, or the like is not added, oxygen reacts to Si, and thus SiO is easily formed. Therefore, the insulating layer 14 may be formed as an interposing layer between the ferroelectric layer 13 which is HZO and the semiconductor layer 16 which is a Si channel. The process of forming the insulating layer 14 may be omitted.

Figure 18:
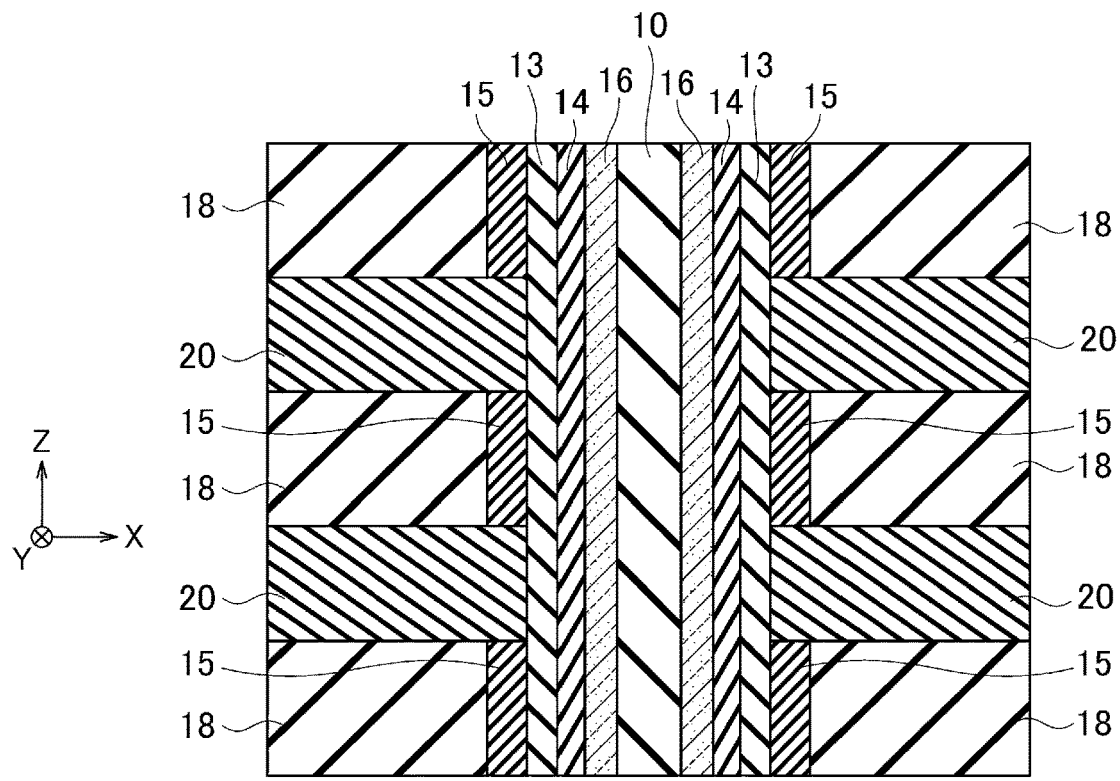
FIG. 18 is a sectional view illustrating the example of the method of manufacturing the nonvolatile semiconductor memory according to the first embodiment.

Subsequently, the semiconductor layer 16 is formed of polysilicon on the inner surface of the opening 54 (FIG. 18). The semiconductor layer 16 is formed by, for example, a CVD method.

Subsequently, an amorphous silicon layer is formed inside the opening 54 to bury the opening 54 (FIG. 18). A silicon oxide film may be formed instead of the amorphous silicon layer. The amorphous silicon layer or the silicon oxide film finally becomes the core unit 10. In this state, the ferroelectric layer 13 and the antiferroelectric layer 15 may be crystallized by a thermal process depending on a case. A temperature of the thermal process is, for example, in the range of about 600° C. or more and 900° C. or less.

Figure 19:
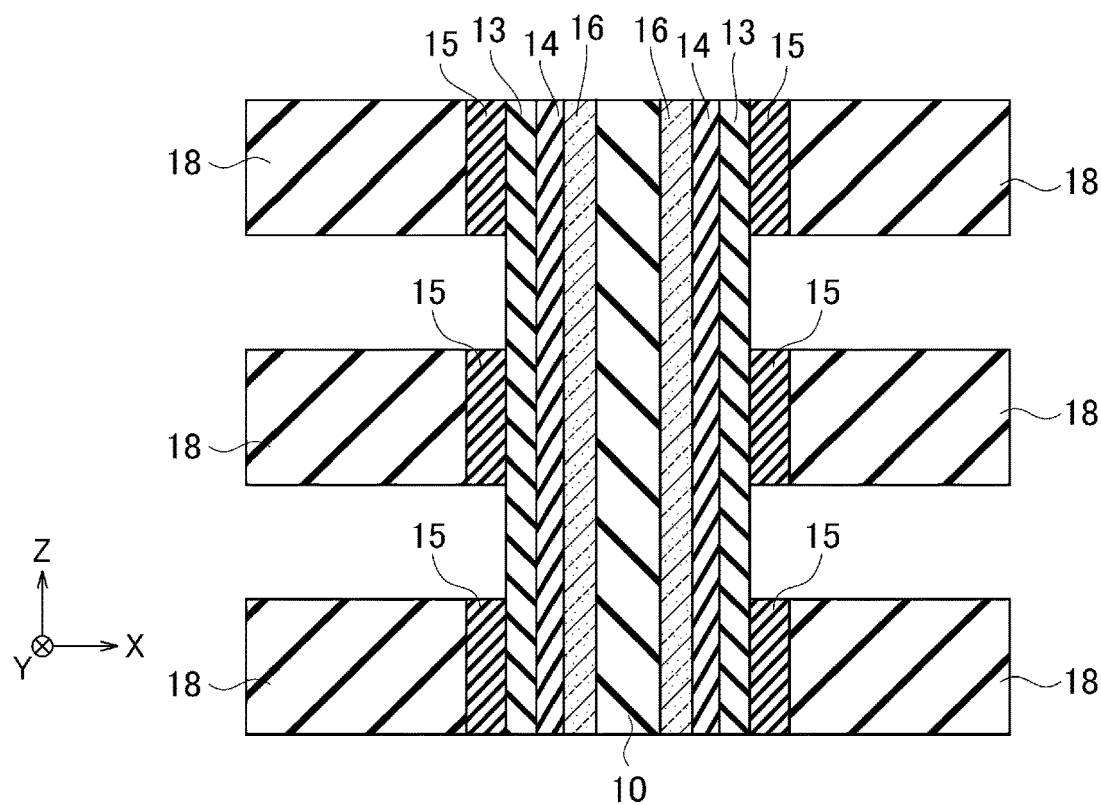
FIG. 19 is a sectional view illustrating the example of the method of manufacturing the nonvolatile semiconductor memory according to the first embodiment.

Subsequently, the silicon nitride layer 20 is selectively removed by wet etching using a groove for an etching (not illustrated) formed in the stacked body 50 (FIG. 19). In the wet etching, for example, a phosphating solution is used. The silicon nitride layer 20 is selectively etched with respect to the silicon oxide layer 18.

Figure 20:
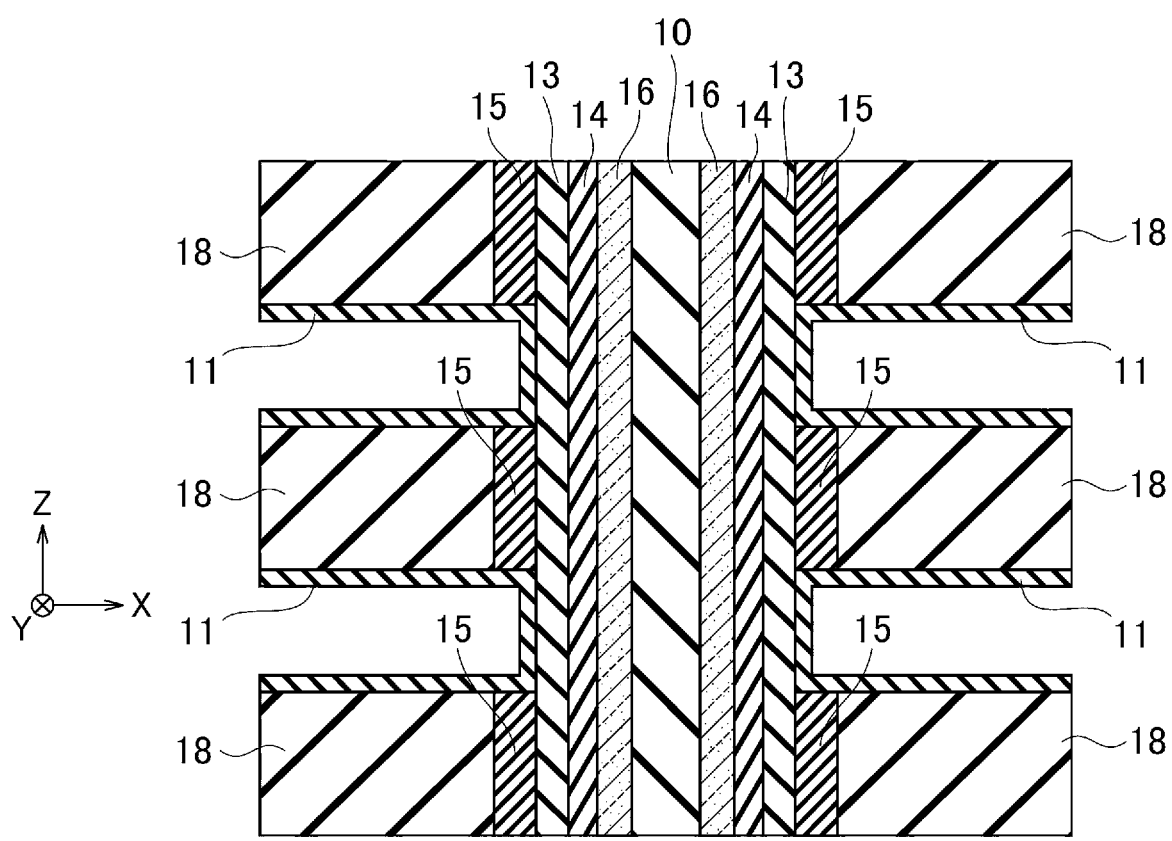
FIG. 20 is a sectional view illustrating the example of the method of manufacturing the nonvolatile semiconductor memory according to the first embodiment.

Subsequently, the barrier metal layer 11 is formed (FIG. 20). The barrier metal layer 11 is formed by, for example, a CVD method. An example of the barrier metal layer 11 is a titanium nitride film.

Through the foregoing processes, the amorphous ferroelectric layer 13 becomes a ferroelectric substance by annealing for crystallizing the amorphous ferroelectric layer 13. In HZO, an orthorhombic HZO is formed by crystallization annealing. The crystallization annealing is performed in, for example, a non-oxidating atmosphere. An amorphous silicon layer is also crystallized to become a polycrystalline silicon layer by the crystallization annealing. The amorphous antiferroelectric layer 15 is also crystallized by the crystallization annealing. The amorphous antiferroelectric layer 15 becomes a crystallized antiferroelectric substance by the crystallization annealing. Tetragonal HZO to which Si is added in the amorphous antiferroelectric layer 15 is formed by the crystallization annealing.

Subsequently, the tungsten layer 12 is formed on the barrier metal layer 11 as a W replacing process (FIG. 8). The tungsten layer 12 is formed by, for example, a CVD method. The tungsten layer 12 is an example of the first potential applying electrode 12WL1 or the second potential applying electrode 12WL2 serving as the word line WL.

Finally, the wakeup can be performed by applying a voltage to the ferroelectric layer 13 serving as a gate insulating film. The wakeup may be performed by increasing the number of cycles of the polarization reversal on the ferroelectric layer 13.

By the foregoing manufacturing method, the memory cell array 100 of the nonvolatile semiconductor memory according to the first embodiment is manufactured.

Advantage of First Embodiment

According to the first embodiment, it is possible to enlarge the memory window and it is possible to provide the nonvolatile semiconductor memory of high cycle durability and a manufacturing method therefor.

Second Embodiment

Figure 21:
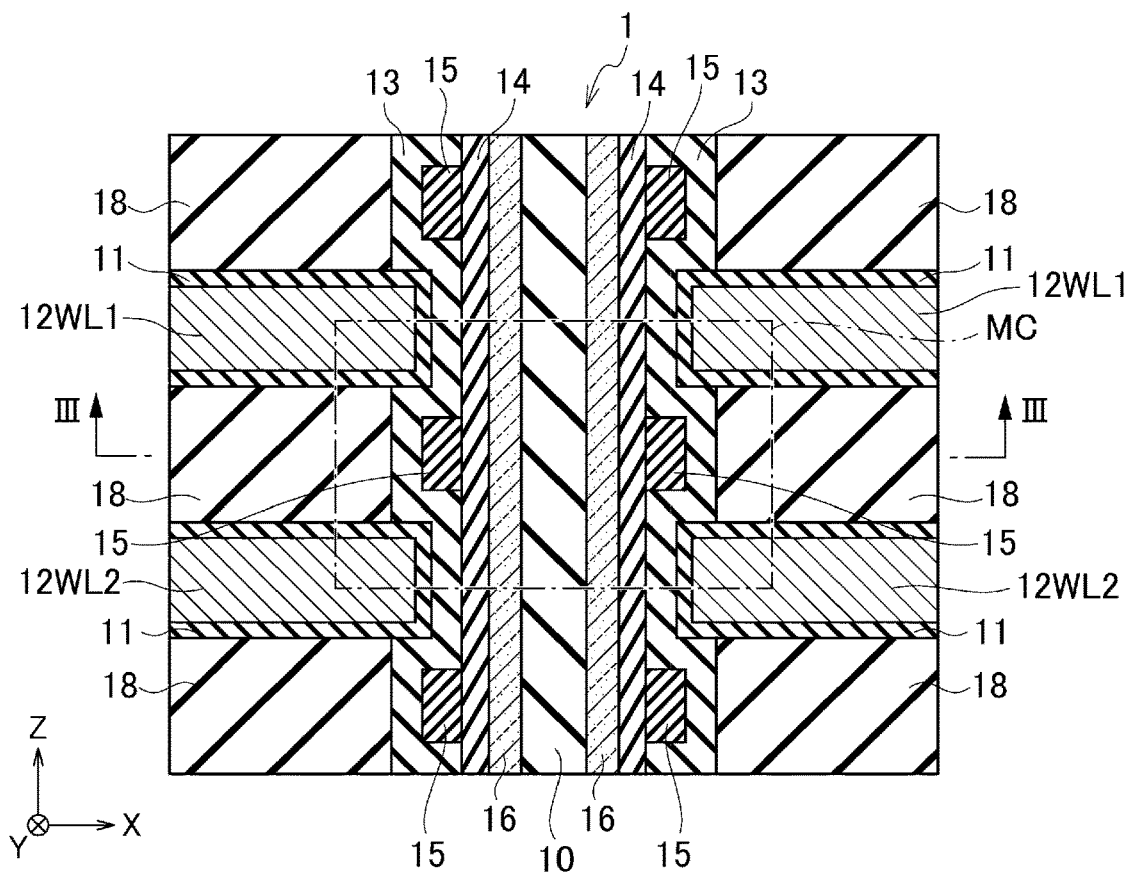
FIG. 21 is a schematic view illustrating a part of a memory cell array of a nonvolatile semiconductor memory according to a second embodiment.
Figure 22:
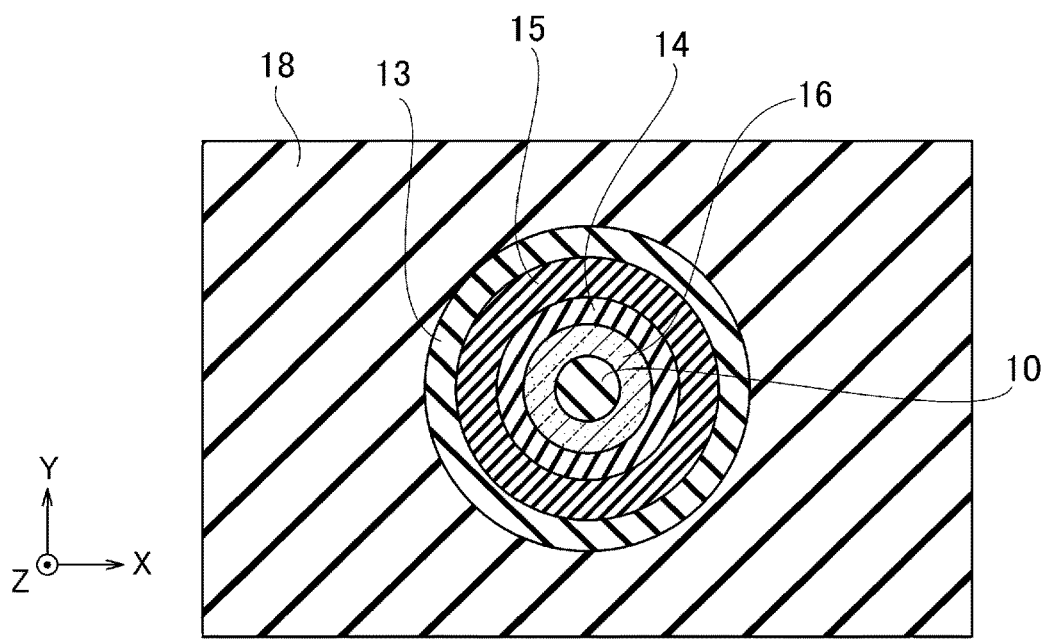
FIG. 22 is a sectional view taken along the line III-III of FIG. 21.

FIG. 21 is a schematic view illustrating a memory cell array of a nonvolatile semiconductor memory 1 according to a second embodiment. FIG. 22 is a sectional view taken along the line III-III of FIG. 21. Hereinafter, the Z direction illustrated in FIGS. 21 and 22 is defined as a first direction, the X direction is defined as a second direction, and the Y direction is defined as a third direction. A block diagram of the nonvolatile semiconductor memory according to the second embodiment is similar to FIG. 6 and an equivalent circuit diagram of the memory cell array of the nonvolatile semiconductor memory according to the second embodiment is similar to FIG. 7.

The nonvolatile semiconductor memory 1 according to the second embodiment includes the memory cell MC including the core unit 10, the semiconductor layer 16, the insulating layer 14, the ferroelectric layer 13, the first potential applying electrode WL1, the second potential applying electrode WL2, the insulating layer 18, and the antiferroelectric layer 15, as illustrated in FIGS. 21 and 22. The core unit 10 extends in the Z direction orthogonal to a semiconductor substrate. The semiconductor layer 16 extends in the Z direction and comes into contact with the core unit 10. The insulating layer 14 extends in the Z direction and comes into contact with the semiconductor layer 16. The ferroelectric layer 13 extends in the Z direction and comes into contact with the insulating layer 14. The first potential applying electrode WL1 extends in the X direction orthogonal to the Z direction and comes into contact with the ferroelectric layer 13. The second potential applying electrode WL2 is adjacent to the first potential applying electrode WL1 in the Z direction, extends in the X direction, and comes into contact with the ferroelectric layer 13. The insulating layer 18 is stacked in the Z direction, is disposed between the first potential applying electrode 12WL1 and the second potential applying electrode 12WL2, and comes into contact with the ferroelectric layer 13. The antiferroelectric layer 15 is buried in the ferroelectric layer 13 between the first potential applying electrode WL1 and the second potential applying electrode WL2 and comes into contact with the insulating layer 14.

The first potential applying electrode 12WL1 may come into contact with the ferroelectric layer 13, with the barrier metal layer 11 interposed therebetween. The second potential applying electrode 12WL2 may come into contact with the ferroelectric layer 13, with the barrier metal layer 11 interposed therebetween. The antiferroelectric layer 15 may be disposed between the first potential applying electrode 12WL1 and the second potential applying electrode 12WL2, with the barrier metal layer 11 interposed therebetween.

In the nonvolatile semiconductor memory according to the second embodiment, the ferroelectric layer 13 and the antiferroelectric layer 15 are oxides that both have Hf and Zr as main components. In the antiferroelectric layer 15, a density of Si, Al, Ge, or Ga is higher in a range of 1% or more and 6% or less than in the ferroelectric layer 13.

In the nonvolatile semiconductor memory according to the second embodiment, a crystalline structure of the ferroelectric layer 13 has an orthorhombic crystal as one main component and the crystalline structure of the antiferroelectric layer 15 has a tetragonal crystal as one main component.

As illustrated in FIGS. 21 to 22, the nonvolatile semiconductor memory 1 according to the second embodiment may include the memory cell MC including: the core unit 10 extending in the Z direction; the semiconductor layer 16 extending in the Z direction and having a cylindrical shape covering the outer circumference of the core unit 10; the insulating layer 14 extending in the Z direction and covering the outer circumference of the semiconductor layer 16; the ferroelectric layer 13 extending in the Z direction and covering the outer circumference of the insulating layer 14; the first potential applying electrode 12WL1 extending in the X direction orthogonal to the Z direction and coming into contact with the ferroelectric layer 13; the second potential applying electrode 12WL2 adjacent to the first potential applying electrode 12WL1 in the Z direction, extending in the X direction, and coming into contact with the ferroelectric layer 13; the insulating layer 18 stacked in the Z direction, disposed between the first potential applying electrode 12WL1 and the second potential applying electrode 12WL2, and coming into contact with the ferroelectric layer 13; and the antiferroelectric layer 15 disposed to be buried in the ferroelectric layer 13 between the first potential applying electrode 12WL1 and the second potential applying electrode 12WL2 and coming into contact with the insulating layer 14. The other configuration is similar to the configuration of the first embodiment.

(Manufacturing Method)

In a method of manufacturing the nonvolatile semiconductor memory 1 according to the second embodiment, the opening 54 is formed in the stacked body 50 of the first insulating layer 18 and the second insulating layer 20, the second amorphous HZO layer 13 is formed on an inner surface of the opening 54 by retreating the first insulating layer 18 of the opening 54 by etching, the first HZO layer 15 is formed on the second HZO layer 13 of the opening, the first HZO layer 15 and the second HZO layer 13 of the opening 54 are flattened, the second HZO layer 13 and the first HZO layer 15 are exposed, the first HZO layer 15 and the second HZO layer 13 are crystallized by a fourth thermal process, and the semiconductor layer 16 and the core unit 10 are sequentially formed on the first HZO layer 15 and the second HZO layer 13 of the opening 54. Further, in a stacked body 50, the second insulating layer 20 is selectively removed by etching and the electrode layer 12 is formed between the first insulating layer 18 exposed after the second insulating layer 20 is removed.

The insulating layer 14 may be formed on the crystallized first HZO layer 15 and second HZO layer 13, the semiconductor layer 16 and the core unit 10 may be formed sequentially on the insulating layer 14, the metal layer 11 may be formed between the insulating layer 18, and the electrode layer 12 may be formed on the metal layer 11.

After the semiconductor layer 16 and the core unit 10 are formed, a fifth thermal process may be performed.

Through a thermal process, an antiferroelectric substance that has a tetragonal crystal as one main component is formed in the first HZO layer 15 and a ferroelectric substance having an orthorhombic crystal as one main component is formed in the second HZO layer 13.

The wakeup can be performed by applying a voltage to the second HZO layer 13. The wakeup may be performed by increasing the number of cycles of polarization reversal on the second HZO layer 13.

Next, a method of manufacturing the nonvolatile semiconductor memory according to the second embodiment will be described. FIGS. 23 to 29 are schematic sectional views illustrating the method of manufacturing the nonvolatile semiconductor memory according to the second embodiment. FIGS. 23 to 29 illustrate a cross-sectional surface corresponding to FIG. 21.

First, as in the method of manufacturing the nonvolatile semiconductor memory according to the first embodiment, the silicon oxide layer 18 and the silicon nitride layer 20 are alternately stacked on a semiconductor substrate (not illustrated) (FIG. 11).

Subsequently, the opening 54 is formed in the silicon oxide layer 18 and a silicon nitride layer 20 (FIG. 12).

Subsequently, a thickness of the silicon oxide layer 18 is retreated by etching (FIG. 13).

Figure 23:
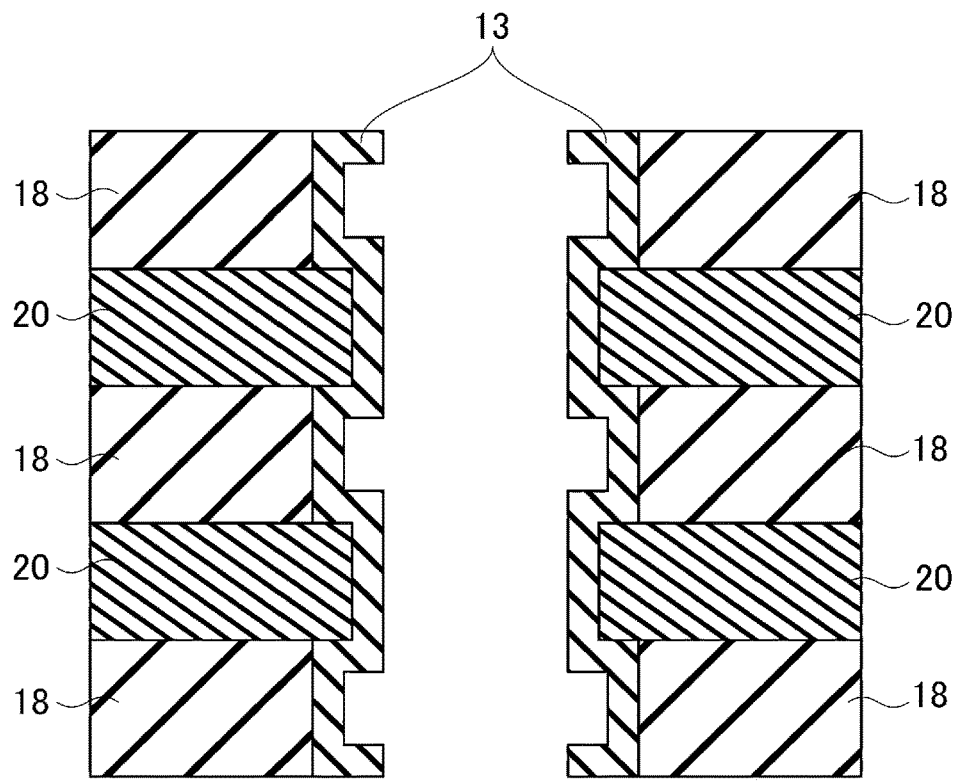
FIG. 23 is a sectional view illustrating an example of a method of manufacturing a nonvolatile semiconductor memory according to the second embodiment.

Next, the second HZO layer 13 is formed on the inner surface of the opening 54 (FIG. 23). The second HZO layer 13 is formed of, for example, HZO to which Si, Al, or the like is not added. HZO to which Si, Al, or the like is not added is formed as a ferroelectric substance. The second HZO layer 13 is formed by, for example, ALD. The second HZO layer 13 is amorphous. The second HZO layer 13 finally becomes a gate insulating layer. A temperature at which the second HZO layer 13 is formed is, for example, in the range of 150° C. or more and 350° C. or less.

Figure 24:
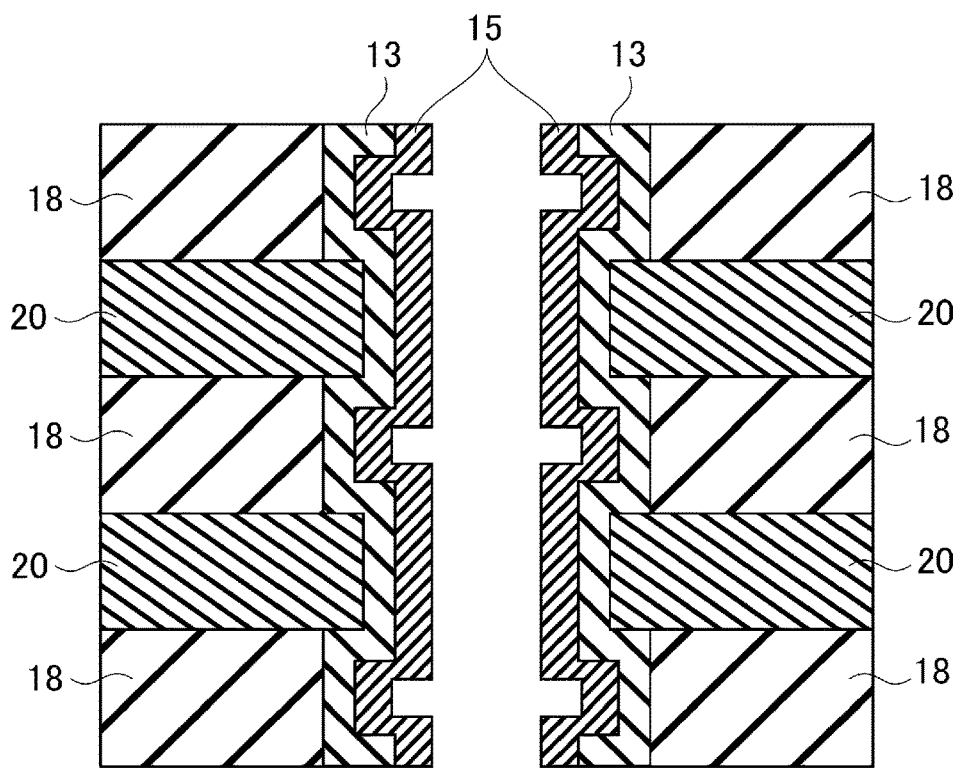
FIG. 24 is a sectional view illustrating the example of the method of manufacturing the nonvolatile semiconductor memory according to the second embodiment.

Subsequently, the first HZO layer 15 is formed on the inner surface of the opening 54 (FIG. 24). Specifically, the first HZO layer 15 is formed of HZO in which Si, Al, Ge, or Ga is added in the range of 1% or more and 6% or less. The first HZO layer 15 is formed by, for example, ALD.

Figure 25:
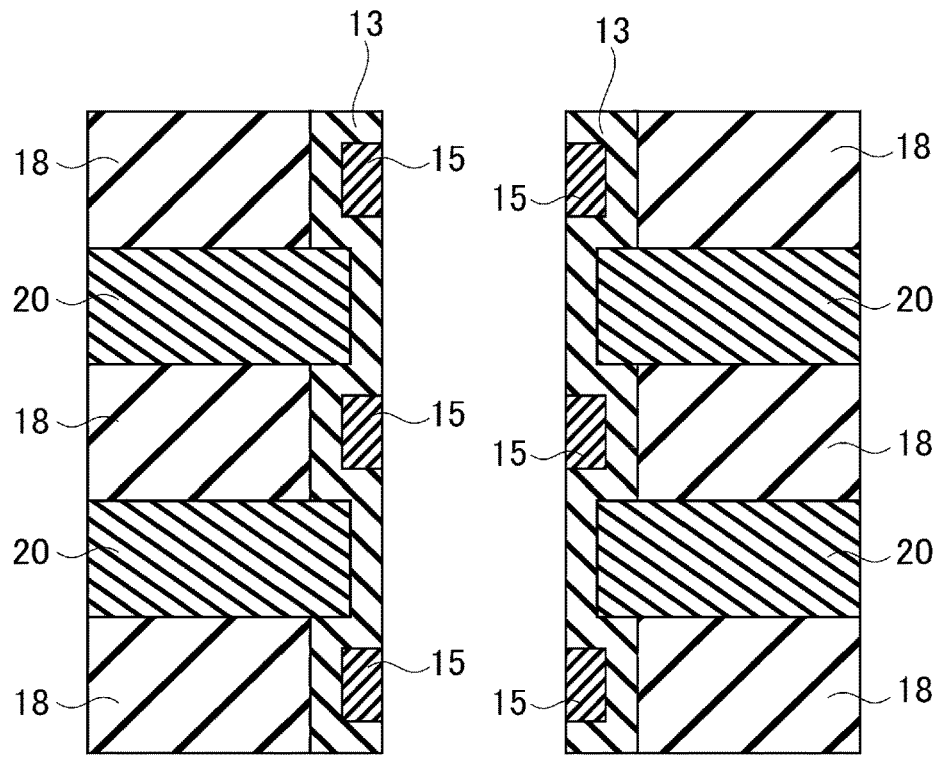
FIG. 25 is a sectional view illustrating the example of the method of manufacturing the nonvolatile semiconductor memory according to the second embodiment.

Subsequently, the second HZO layer 13 and the first HZO layer 15 on the inner surface of the opening 54 are flattened by a leveling process (FIG. 25). As a result, as illustrated in FIG. 25, the first HZO layer 15 and the second HZO layer 13 are flush with each other on the inner surface of the opening 54, and the ferroelectric layer 13 is exposed to the inner surface of the opening 54. The first HZO layer 15 and the second HZO layer 13 are crystallized by the fourth thermal process. A temperature of the thermal process is, for example, in the range of about 600° C. or more and 900° C. or less. The first HZO layer 15 becomes an antiferroelectric substance and the second HZO layer 13 becomes a ferroelectric substance by a thermal process.

Figure 26:
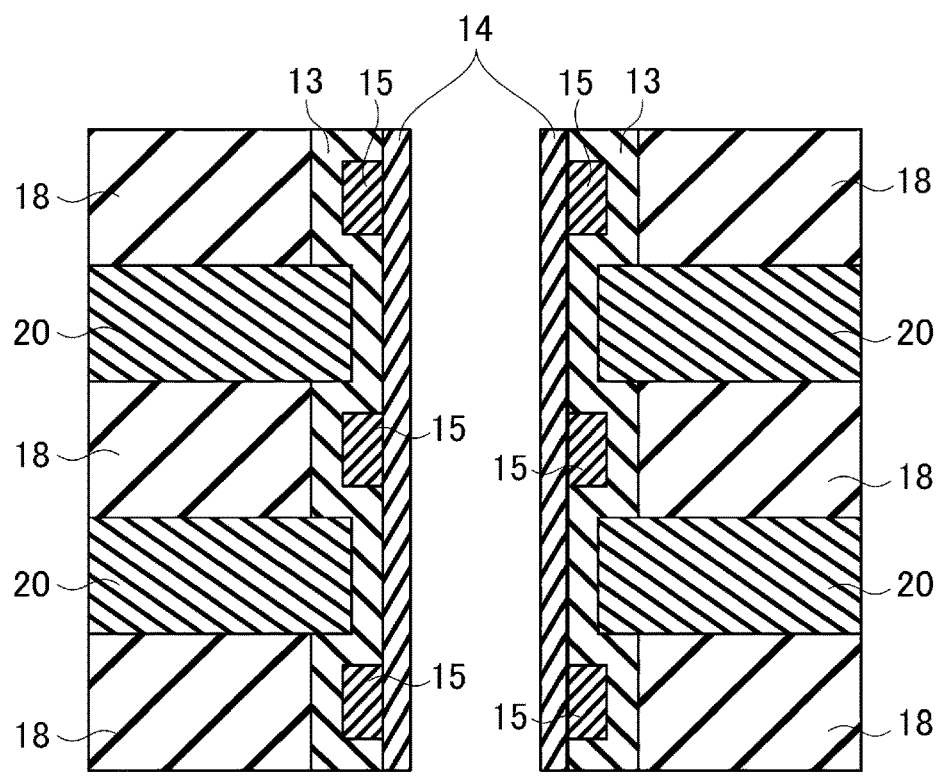
FIG. 26 is a sectional view illustrating the example of the method of manufacturing the nonvolatile semiconductor memory according to the second embodiment.

Subsequently, the insulating layer 14 is formed on the inner surface of the opening 54 (FIG. 26). The insulating layer 14 is formed of a silicon oxide film SiO or a silicon nitride film SiN. The insulating layer 14 is formed by, for example, a CVD method. When the semiconductor layer 16 comes into direct contact with the ferroelectric layer 13 which is HZO to which Si, Al, or the like is not added, oxygen reacts to Si, and thus SiO is easily formed. Therefore, the insulating layer 14 may be formed between the ferroelectric layer 13 which is HZO and the semiconductor layer 16 which is a Si channel. When the insulating layer 14 is formed, Si is doped to the crystallized first HZO layer 15 by thermal diffusion, so that an antiferroelectric layer is formed. Through the thermal process, Si contained in the insulating layer 14 is thermally diffused in the ferroelectric layer 13, so that the antiferroelectric layer 15 is formed. The process of forming the insulating layer 14 may be omitted.

Figure 27:
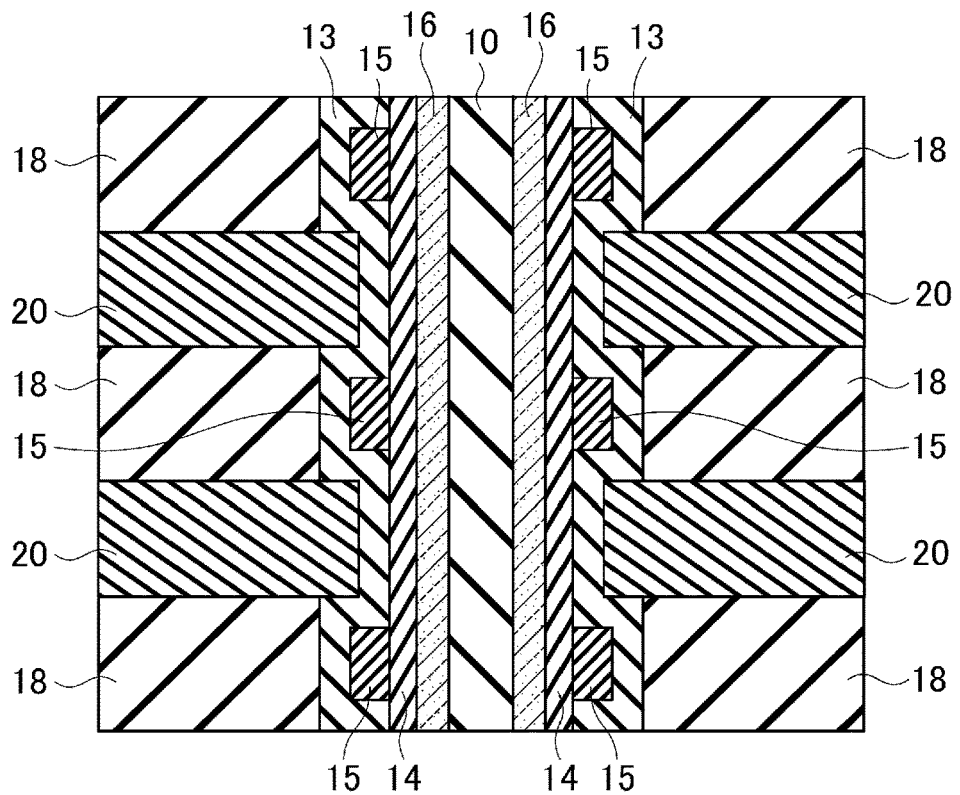
FIG. 27 is a sectional view illustrating the example of the method of manufacturing the nonvolatile semiconductor memory according to the second embodiment.

Subsequently, the semiconductor layer 16 is formed of polysilicon on the inner surface of the opening 54 (FIG. 27). The semiconductor layer 16 is formed by, for example, a CVD method.

Subsequently, an amorphous silicon layer is formed in the opening 54 to bury the opening 54 (FIG. 27). A silicon oxide film may be formed instead of the amorphous silicon layer. The amorphous silicon layer or the silicon oxide film finally becomes the core unit 10. In this state, the ferroelectric layer 13 and the antiferroelectric layer 15 may be crystallized by a thermal process depending on a case. A temperature of the thermal process is, for example, in the range of about 600° C. or more and 900° C. or less.

Figure 28:
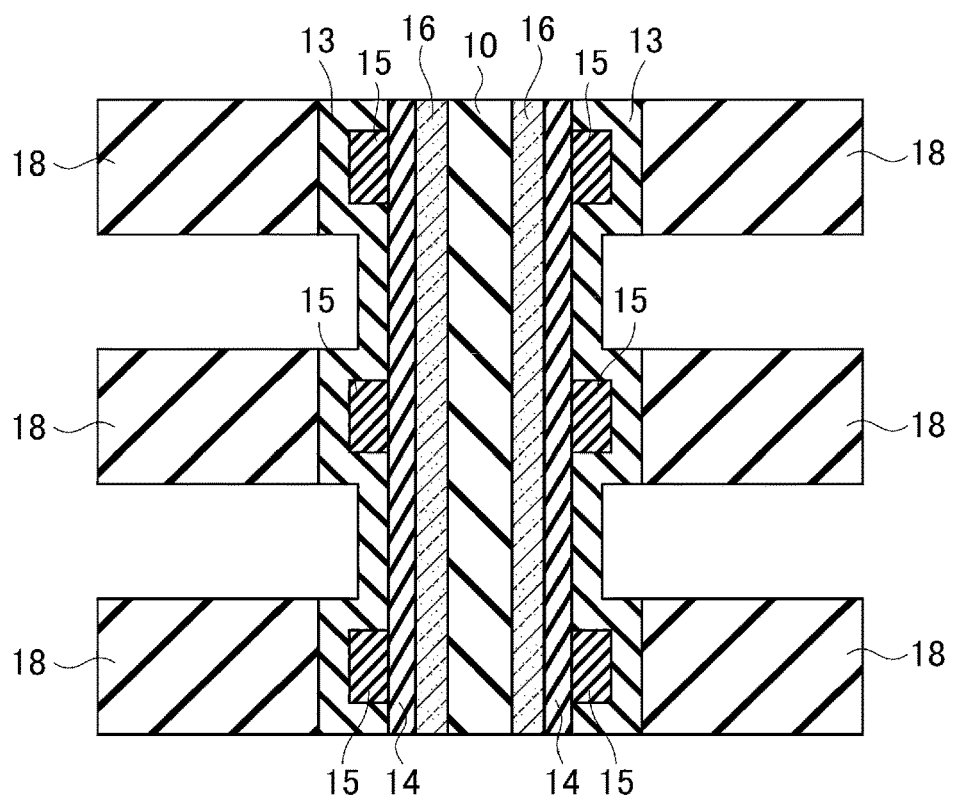
FIG. 28 is a sectional view illustrating the example of the method of manufacturing the nonvolatile semiconductor memory according to the second embodiment.

Subsequently, the silicon nitride layer 20 is selectively removed by wet etching using a groove for an etching (not illustrated) formed in the stacked body 50 (FIG. 28). In the wet etching, for example, a phosphating solution is used. The silicon nitride layer 20 is selectively etched with respect to the silicon oxide layer 18.

Figure 29:
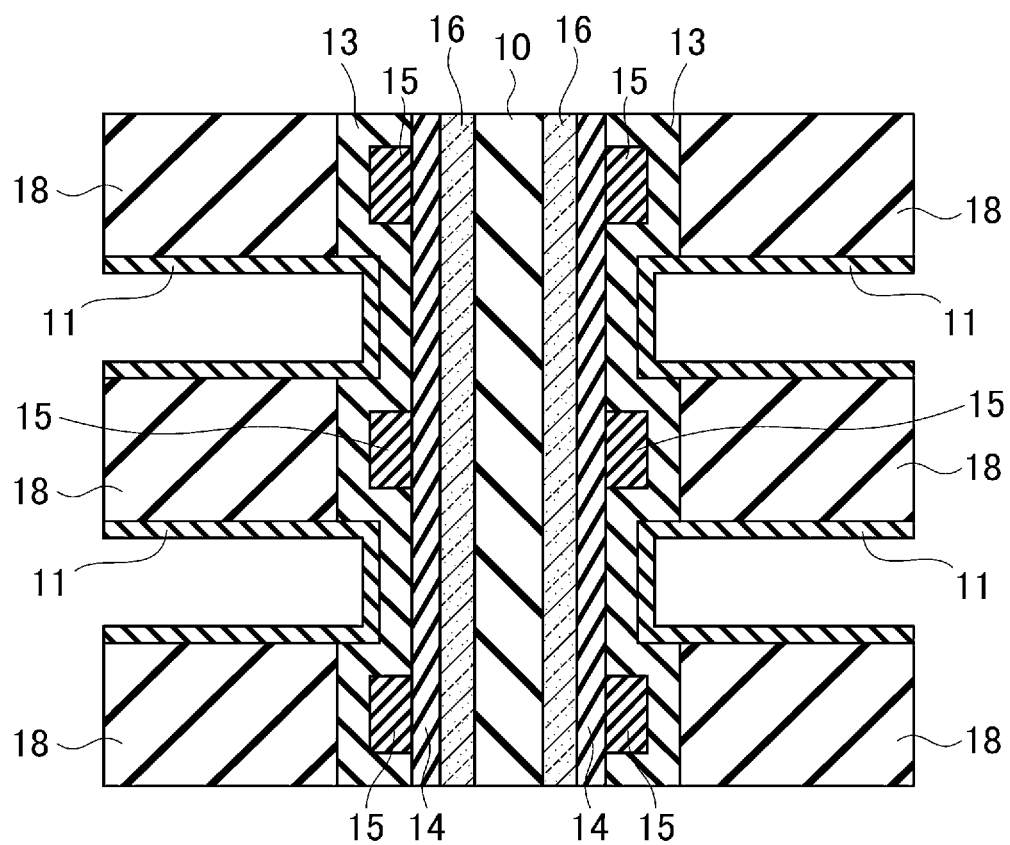
FIG. 29 is a sectional view illustrating the example of the method of manufacturing the nonvolatile semiconductor memory according to the second embodiment.

Subsequently, the barrier metal layer 11 is formed (FIG. 29). The barrier metal layer 11 is formed by, for example, a CVD method. An example of the barrier metal layer 11 is a titanium nitride film.

Through the foregoing processes, the amorphous ferroelectric layer 13 becomes a ferroelectric substance by annealing for crystallizing the amorphous ferroelectric layer 13. In HZO, an orthorhombic HZO is formed by crystallization annealing. The crystallization annealing is performed in, for example, a non-oxidating atmosphere. An amorphous silicon layer is also crystallized to become a polycrystalline silicon layer by the crystallization annealing. The amorphous antiferroelectric layer 15 is also crystallized by the crystallization annealing. The amorphous antiferroelectric layer 15 becomes an antiferroelectric substance by the crystallization annealing. Tetragonal HZO to which Si is added in the amorphous antiferroelectric layer 15 is formed by the crystallization annealing.

Subsequently, the tungsten layer 12 is formed on the barrier metal layer 11 as a W replacing process (FIG. 8). The tungsten layer 12 is formed by, for example, a CVD method. The tungsten layer 12 is an example of the first potential applying electrode 12WL1 or the second potential applying electrode 12WL2 serving as the word line WL.

Finally, the wakeup can be performed by applying a voltage to the ferroelectric layer 13 serving as a gate insulating film. The wakeup may be performed by increasing the number of cycles of polarization reversal with respect to the ferroelectric layer 13.

According to the forgoing manufacturing method, the memory cell array 100 of the nonvolatile semiconductor memory according to the second embodiment is manufactured.

Advantages of Second Embodiment

According to the second embodiment, as in the first embodiment, it is possible to enlarge the memory window and it is possible to provide the nonvolatile semiconductor memory of high cycle durability and the manufacturing method therefor.

An antiferroelectric substance can be stably crystallized by adding Si or Al to an HZO film which is a ferroelectric substance in the range of 1% or more and 6% or less. A crystalline state of the antiferroelectric substance is good, leakage characteristics are improved, and breakdown voltage characteristics are improved.

According to the second embodiment, it is possible to alleviate electric field concentration of a fringe electric field between the antiferroelectric layer 15 and the word line electrode WL. In the antiferroelectric layer to which Si is added, a trap level related to trap assisted tunneling decreases. Therefore, a trap density is low and it is possible to reduce noise by trapped charges generated in an interlayer portion when a read voltage is applied. It has been confirmed that a leakage current is reduced by about one digit to two digits.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A nonvolatile semiconductor memory comprising a memory cell including:
   a core structure extending in a first direction orthogonal to a semiconductor substrate;
   a semiconductor layer extending in the first direction and in contact with the core structure;
   an insulating layer extending in the first direction and in contact with the semiconductor layer;
   a ferroelectric layer extending in the first direction and in contact with the insulating layer;
   a first electrode extending in a second direction orthogonal to the first direction and in contact with the ferroelectric layer;
   a second electrode adjacent to the first electrode in the first direction, extending in the second direction, and in contact with the ferroelectric layer;
   an insulating layer stacked in the first direction and disposed between the first and second electrodes; and
   an antiferroelectric layer disposed between the first and second electrodes, and in contact with the insulating layer and the ferroelectric layer.

2. A nonvolatile semiconductor memory comprising a memory cell including:
   a core structure extending in a first direction orthogonal to a semiconductor substrate;
   a semiconductor layer extending in the first direction and in contact with the core structure;
   an insulating layer extending in the first direction and in contact with the semiconductor layer;
   a ferroelectric layer extending in the first direction and in contact with the insulating layer;
   a first electrode extending in a second direction orthogonal to the first direction and in contact with the ferroelectric layer;
   a second electrode adjacent to the first electrode in the first direction, extending in the second direction, and in contact with the ferroelectric layer;

an insulating layer stacked in the first direction, disposed between the first and second electrodes, and in contact with the ferroelectric layer; and an antiferroelectric layer buried in the ferroelectric layer between the first and second electrodes, and in contact with the insulating layer.

3. The nonvolatile semiconductor memory according to claim 1,
wherein the ferroelectric layer is an oxide with Hf and Zr,
wherein the antiferroelectric layer is an oxide with the Hf and Zr, and
wherein, in the antiferroelectric layer, a density of Si, Al, Ge, or Ga is higher in a range of 1% or more and 6% or less than in the ferroelectric layer.

4. The nonvolatile semiconductor memory according to claim 3,
wherein a crystalline structure of the ferroelectric layer has an orthorhombic crystal, and
wherein a crystalline structure of the antiferroelectric layer has a tetragonal crystal.

5. A nonvolatile semiconductor memory comprising a memory cell including:
a core structure extending in a first direction orthogonal to a semiconductor substrate;
a semiconductor layer extending in the first direction and having a cylindrical shape around an outer circumference of the core structure;
an insulating layer extending in the first direction and around an outer circumference of the semiconductor layer;
a ferroelectric layer extending in the first direction and around an outer circumference of the insulating layer;
a first electrode extending in a second direction orthogonal to the first direction and in contact with the ferroelectric layer;
a second electrode adjacent to the first electrode in the first direction, extending in the second direction, and in contact with the ferroelectric layer;
an insulating layer stacked in the first direction and disposed between the first and second electrodes; and
an antiferroelectric layer disposed between the first and second electrodes and in contact with the insulating layer and the ferroelectric layer.

6. A nonvolatile semiconductor memory comprising a memory cell including:
a core structure extending in a first direction orthogonal to a semiconductor substrate;
a semiconductor layer extending in the first direction and having a cylindrical shape around an outer circumference of the core structure;
an insulating layer extending in the first direction and around an outer circumference of the semiconductor layer;
a ferroelectric layer extending in the first direction and around an outer circumference of the insulating layer;
a first potential applying electrode extending in a second direction orthogonal to the first direction and in contact with the ferroelectric layer;
a second potential applying electrode adjacent to the first potential applying electrode in the first direction, extending in the second direction, and in contact with the ferroelectric layer;
an insulating layer stacked in the first direction, disposed between the first and second electrodes, and in contact with the ferroelectric layer; and
an antiferroelectric layer buried in the ferroelectric layer between the first and second electrodes, and in contact with the insulating layer.

7. The nonvolatile semiconductor memory according to claim 5,
wherein the ferroelectric layer is an oxide that has Hf and Zr,
wherein the antiferroelectric layer is an oxide that has the Hf and Zr, and
wherein, in the antiferroelectric layer, a density of Si, Al, Ge, or Ga is higher in a range of 1% or more and 6% or less than in the ferroelectric layer.

8. The nonvolatile semiconductor memory according to claim 7,
wherein a crystalline structure of the ferroelectric layer has an orthorhombic crystal, and
wherein a crystalline structure of the antiferroelectric layer has a tetragonal crystal.

9. The nonvolatile semiconductor memory according to claim 5, further comprising:
a first select transistor including the semiconductor layer extending in the first direction, the insulating layer extending in the first direction and in contact with the semiconductor layer, and a third electrode extending in the second direction and in contact with the insulating layer; and
a memory cell string including the first select transistor and a plurality of memory cells, the plurality of memory cells being connected in series, the first select transistor being connected to a first end of the memory cell, and a fourth electrode being connected to a second end of the memory cell.

10. The nonvolatile semiconductor memory according to claim 9, further comprising:
a fifth electrode connected to the first select transistor and extending in a third direction orthogonal to the first direction and a second direction orthogonal to the first direction; and
a sequencer configured to selectively perform a read operation or a write operation on, among a plurality of the fifth electrodes, some of the fifth electrodes by applying a voltage between the fifth electrode and the fourth electrode.

* * * * *